United States Patent
Gao et al.

(10) Patent No.: US 11,902,919 B2
(45) Date of Patent: Feb. 13, 2024

(54) SYNCHRONIZATION SIGNAL TRANSMISSION METHOD, NETWORK DEVICE, AND TERMINAL DEVICE

(71) Applicant: Huawei Technologies Co., Ltd., Guangdong (CN)

(72) Inventors: Kuandong Gao, Chengdu (CN); Huang Huang, Chengdu (CN); Mao Yan, Chengdu (CN); Hua Shao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 333 days.

(21) Appl. No.: 17/307,883

(22) Filed: May 4, 2021

(65) Prior Publication Data

US 2021/0258902 A1 Aug. 19, 2021

Related U.S. Application Data

(63) Continuation of application No. PCT/CN2019/115058, filed on Nov. 1, 2019.

(30) Foreign Application Priority Data

Nov. 9, 2018 (CN) .......................... 201811333564.1

(51) Int. Cl.
*H04W 56/00* (2009.01)
*H04W 72/04* (2023.01)
(Continued)

(52) U.S. Cl.
CPC ....... *H04W 56/001* (2013.01); *H04J 11/0073* (2013.01); *H04J 11/0076* (2013.01);
(Continued)

(58) Field of Classification Search
CPC ............. H04W 56/001; H04W 56/006; H04W 56/0015; H04W 72/0446; H04W 72/30;
(Continued)

(56) References Cited

U.S. PATENT DOCUMENTS

2018/0092056 A1 3/2018 Zeng et al.
2019/0215790 A1 7/2019 Kim et al.
(Continued)

FOREIGN PATENT DOCUMENTS

CN 101414902 A 4/2009
CN 108012329 A 5/2018
(Continued)

OTHER PUBLICATIONS

Motorola Mobility et al.: Initial Accessand Diversity in RACH transmissions ,3GPP DRAFT;R1-1812426 Oct. 30, 2018 XP051478626,total 4 pages.
(Continued)

*Primary Examiner* — Candal Elpenord
(74) *Attorney, Agent, or Firm* — WOMBLE BOND DICKINSON (US) LLP

(57) ABSTRACT

Embodiments of this application provide a synchronization signal transmission method, a network device, and a terminal device. The method includes: determining, by a network device, time domain positions for sending m synchronization signal blocks, where the time domain positions are {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols; and sending, by the network device, the synchronization signal blocks to a terminal device in the time domain positions of the synchro- (Continued)

nization signal blocks. The technical solutions provided in this application have relatively high flexibility, and can meet, to some extent, a synchronization signal block sending requirement for a high-frequency technology.

20 Claims, 10 Drawing Sheets

(51) Int. Cl.
*H04W 72/00* (2023.01)
*H04J 11/00* (2006.01)
*H04W 72/0446* (2023.01)
*H04W 72/30* (2023.01)

(52) U.S. Cl.
CPC ..... *H04W 56/006* (2013.01); *H04W 72/0446* (2013.01); *H04W 72/30* (2023.01)

(58) Field of Classification Search
CPC . H04J 11/0073; H04J 11/0076; H04L 5/0051; H04L 5/0048; H04L 5/0053; H04L 5/0078
USPC ......................................................... 370/503
See application file for complete search history.

(56) References Cited

U.S. PATENT DOCUMENTS

| | | | | |
|---|---|---|---|---|
| 2020/0067755 | A1* | 2/2020 | Pan | .................. H04L 27/2656 |
| 2020/0076568 | A1* | 3/2020 | Nguyen | ............ H04W 56/0005 |
| 2021/0227418 | A1* | 7/2021 | Hwang | .................. H04W 24/10 |
| 2021/0307098 | A1* | 9/2021 | Chae | ..................... H04W 76/15 |

FOREIGN PATENT DOCUMENTS

| | | |
|---|---|---|
| CN | 108111280 A | 6/2018 |
| CN | 108270710 A | 7/2018 |
| CN | 108631843 A | 10/2018 |
| CN | 108632982 A | 10/2018 |
| EP | 3425825 A1 | 1/2019 |
| KR | 20180091241 A | 8/2018 |
| KR | 101915997 B1 | 11/2018 |
| WO | 2018203617 A1 | 11/2018 |

OTHER PUBLICATIONS

3GPP TS 36.212 V13.0.0 (Dec. 2015), 3rd Generation Partnership Project; Technical Specification Group Radio Access Network; Evolved Universal Terrestrial Radio Access (E-UTRA); Multiplexing and channel coding(Release 13), 121 pages.
3GPP TS 36.211 V12.4.0 (Dec. 2014), 3rd Generation Partnership Project; Technical Specification Group Radio Access Network; Evolved Universal Terrestrial Radio Access (E-UTRA); Physical channels and modulation(Release 12), 124 pages.
3GPP TS 36.213 V13.0.0 (Dec. 2015), 3rd Generation Partnership Project; Technical Specification Group Radio Access Network; Evolved Universal Terrestrial Radio Access (E-UTRA); Physical layer procedures(Release 13), 326 pages.
Qualcomm Incorporated, Outer erasure code use cases and evaluation assumptions. 3GPP TSG-RAN WG1 #85 May 23-27, 2016, Nanjing, China, R1-164703, 6 pages.

* cited by examiner

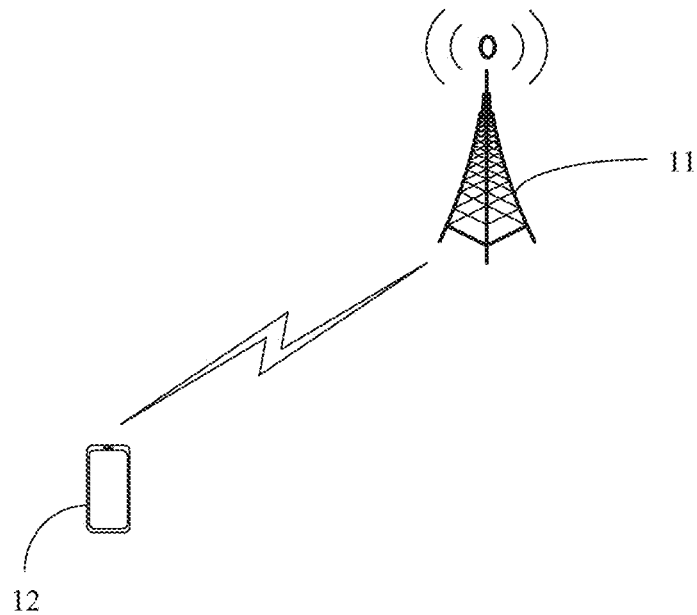

FIG. 1

A network device determines time domain positions for sending m synchronization signal blocks, where the time domain positions of the synchronization signal blocks are one or more positions in {s1, s2, ..., sm}+n×T, s1 represents a start symbol index of the first synchronization signal block in a time unit, s2 represents a start symbol index of the second synchronization signal block in the time unit, sm represents a start symbol index of an mth synchronization signal block in the time unit, the time unit includes T symbols, m is an integer in [1, T], T is any one of 12, 24, 36, 48, 60, 72, 84, and 96, n represents a value of an index of the time unit, and n is an integer in [1, 157] — S202

The network device sends the synchronization signal blocks to a terminal device in the time domain positions of the synchronization signal blocks — S204

FIG. 2

SYNCHRONIZATION SIGNAL TRANSMISSION METHOD, NETWORK DEVICE, AND TERMINAL DEVICE

CROSS-REFERENCE TO RELATED APPLICATIONS

This application a continuation of International Application No. PCT/CN2019/115058, filed on Nov. 1, 2019, which claims priority to Chinese Patent Application No. 201811333564.1, filed on Nov. 9, 2018. The disclosures of the aforementioned applications are hereby incorporated by reference in their entireties.

TECHNICAL FIELD

This application relates to the field of communications technologies, and in particular, to a synchronization signal transmission method, a network device, and a terminal device.

BACKGROUND

Development of mobile services imposes an increasingly high requirement on a data rate and efficiency in wireless communication. A terminal device may obtain identification information of a cell by using a synchronization signal (SS), and perform time-frequency synchronization after accessing a wireless network. The SS includes a primary synchronization signal (PSS) and a secondary synchronization signal (SSS). With development of high-frequency technologies, a concept of a synchronization signal block (SSB) is further put forward. In addition to a PSS and an SSS, a resource of an SSB may be further used to transmit a physical broadcast channel (PBCH).

In a current technology, a time domain position of an SSB is fixed in a half-frame. An existing SSB pattern is designed based on that each slot includes 14 symbols. However, with the development of the high-frequency technologies, for example, an E band (60 to 90 EHz band) technology, a requirement for a larger subcarrier spacing is imposed. However, a coverage area of a base station with a larger subcarrier spacing is relatively small. To reduce interference, the base station needs to use a longer cyclic prefix (CP), for example, an extended cyclic prefix (ECP). However, when the ECP is used, a quantity of symbols in each slot is reduced. In this case, each slot includes only 12 symbols.

Therefore, the existing SSB pattern is not applicable to a scenario in which each slot includes 12 symbols. Flexibility is relatively low, and a synchronization signal block cannot be transmitted in a scenario in which quantities of symbols are different.

SUMMARY

This application provides a synchronization signal transmission method, a network device, and a terminal device, to improve flexibility of a synchronization signal transmission method, and/or meet, to at least some extent, a synchronization signal block sending requirement for a high-frequency technology.

According to embodiments of a first aspect, this application provides a synchronization signal transmission method. The method may include: A network device determining time domain positions of m synchronization signal blocks that are actually sent, and sending (e.g., transmitting, providing, delivers) the synchronization signal blocks at the determined time domain positions, where the determined time domain positions are one or more in $\{s1, s2, \ldots, sm\}+n \times T$, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157]. According to the solution provided in this embodiment, a synchronization signal block sending requirement in application scenarios with different quantities of symbols can be met, a synchronization signal block sending requirement in an application scenario of a high-frequency technology can be met to some extent, and stability and/or flexibility of data sending can be improved.

In some embodiments, each synchronization signal block in the synchronization signal blocks carries first information, and the first information is used to indicate a time domain position index of the synchronization signal block. In some embodiments, the first information is one or more demodulation reference signals (DMRS). In the foregoing implementation, the time domain position may be indicated by using a sequence of several bits. This implementation is simple, and system resources are saved.

The first information may be represented by using an x-bit sequence, where x is an integer greater than 0. In a possible implementation, a value of x is 4, 5, or 6. During specific implementation, the sequence in this embodiment may be any one of the following: a longest linear feedback shift register m-sequence, a constant amplitude zero auto-correlation ZC sequence, a pseudo-random Gold sequence, or a Boltzmann discrete linear algebraic code Golden sequence.

In some embodiments, the method may include the following operation: The network device sends second information, where the second information is used to indicate information about the sent synchronization signal blocks. In other words, the terminal device is notified, by using the second information, of the information about the sent synchronization signal blocks, so that the terminal device can determine, based on the second information, whether all of the synchronization signal blocks have been received.

In this embodiment of this application, the second information may be beam group information. The beam group information may be represented by using fields whose lengths are N bits and M bits respectively, where the field with the N bits represent sent synchronization signal block groups, and the field with the M bits are synchronization signal blocks in each sent synchronization signal block group. During specific implementation, in the foregoing beam group information, N is 16 and M is 16; N is 16 and M is 8; N is 8 and M is 16; or N is 11 and M is 11. This indication manner is simple and convenient, and has relatively high implementability and flexibility. In some embodiments, a receive end of the synchronization signal blocks can clearly determine (e.g., ascertain, detect) whether a quantity of received synchronization signal blocks is correct.

According to embodiments of a second aspect, this application provides a synchronization signal transmission method. The method includes: A terminal device receives m synchronization signal blocks sent by a network device, and then the terminal device determines, based on information about a synchronization signal block in the synchronization signal blocks, a time domain position of the synchronization signal block. The time domain position of the synchronization signal block is one of {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157]. According to the solution provided in this embodiment, a synchronization signal block sending requirement in application scenarios with different quantities of symbols can be met, a synchronization signal block sending requirement in an application scenario of a high-frequency technology can be met to some extent, and stability and/or flexibility of data sending can be improved.

In some embodiments, each synchronization signal block in the synchronization signal blocks carries first information, and the first information is used to indicate a time domain position index of the synchronization signal block. In some embodiments, the terminal device may determine the time domain position of the synchronization signal block with reference to the first information. In other words, the terminal device determines, based on the first information, the time domain position of the synchronization signal block that carries the first information. According to an indication of the first information, the terminal device can conveniently determine the time domain position of the synchronization signal block. This implementation is simple and easy to implement, and is easy to extend.

In some embodiments, the first information may be represented by using an x-bit sequence, where x is an integer greater than 0. In the foregoing implementation, the time domain position may be indicated by using a sequence of several bits. This implementation is simple, and system resources are saved. In a possible implementation, a value of x is 4, 5, or 6. During specific implementation, the sequence in this embodiment may be any one of the following: a longest linear feedback shift register m-sequence, a constant amplitude zero auto-correlation ZC sequence, a pseudo-random Gold sequence, or a Boltzmann discrete linear algebraic code Golden sequence.

In some embodiments, the method may include the following operation: The terminal device receives second information, where the second information is used to indicate information about the sent synchronization signal blocks.

In this embodiment of this application, the second information may be beam group information. The beam group information may be represented by using fields whose lengths are N bits and M bits respectively, where the field with the N bits represent sent synchronization signal block groups, and the field with the M bits are synchronization signal blocks in each sent synchronization signal block group. During specific implementation, N is 16 and M is 16; N is 16 and M is 8; N is 8 and M is 16; or N is 11 and M is 11. This indication manner is simple and convenient, and has relatively high implementability and flexibility. In some embodiments, a receive end of the synchronization signal blocks can clearly determine whether a quantity of received synchronization signal blocks is correct.

According to embodiments of a third aspect, this application provides a network device, including a processing module and a sending module. The processing module is configured (e.g., initialized, adjusted) to determine time domain positions for sending (e.g., delivering, providing, transmitting) m synchronization signal blocks, where the time domain positions of the synchronization signal blocks are one or more positions in {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157]. The sending module is configured to send the synchronization signal blocks in the time domain positions. According to the solution provided in this embodiment, a synchronization signal block sending requirement in application scenarios with different quantities of symbols can be met, a synchronization signal block sending requirement in an application scenario of a high-frequency technology can be met to some extent, and stability and/or flexibility of data sending can be improved.

In some embodiments, each synchronization signal block in the synchronization signal blocks carries first information, and the first information is used to indicate a time domain position index of the synchronization signal block. In some embodiments, the first information is one or more demodulation reference signals DMRSs.

In some embodiments, the first information may be represented by using an x-bit sequence, where x is an integer greater than 0. In the foregoing implementation, the time domain position may be indicated by using a sequence of several bits. This implementation is simple, and system resources are saved. In a possible implementation, a value of x is 4, 5, or 6. During specific implementation, the sequence in this embodiment may be any one of the following: a longest linear feedback shift register m-sequence, a constant amplitude zero auto-correlation ZC sequence, a pseudo-random Gold sequence, or a Boltzmann discrete linear algebraic code Golden sequence.

In some embodiments, the sending module is configured to send second information, where the second information is used to indicate information about the sent synchronization signal blocks. In other words, the terminal device is notified, by using the second information, of the information about the sent synchronization signal blocks, so that the terminal device can determine, based on the second information, whether all of the synchronization signal blocks have been received.

In this embodiment of this application, the second information may be beam group information. The beam group information may be represented by using fields whose lengths are N bits and M bits respectively, where the field with the N bits represent sent synchronization signal block groups, and the field with the M bits are synchronization signal blocks in each sent synchronization signal block group. During specific implementation, in the foregoing beam group information, N is 16 and M is 16; N is 16 and M is 8; N is 8 and M is 16; or N is 11 and M is 11. This indication manner is simple and convenient, has relatively high feasibility and flexibility, and reduces data bit overheads.

According to embodiments of a fourth aspect, this application provides a network device, including a receiving module and a processing module. The receiving module is configured to receive m synchronization signal blocks sent by a network device. The processing module is configured to determine a time domain position of a synchronization signal block in the synchronization signal blocks based on information about the synchronization signal block. The time domain position of the synchronization signal block is one of {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157]. According to the solution provided in this embodiment, a synchronization signal block sending requirement in application scenarios with different quantities of symbols can be met, a synchronization signal block sending requirement in an application scenario of a high-frequency technology can be met to some extent, and stability and/or flexibility of data sending can be improved.

In some embodiments, each synchronization signal block in the synchronization signal blocks carries first information, and the first information is used to indicate a time domain position index of the synchronization signal block. In some embodiments, the terminal device may determine the time domain position of the synchronization signal block with reference to the first information. In other words, the terminal device determines, based on the first information, the time domain position of the synchronization signal block that carries the first information. According to an indication of the first information, the terminal device can conveniently determine the time domain position of the synchronization signal block. This implementation is simple and easy to implement, and is easy to extend.

In some embodiments, the first information may be represented by using an x-bit sequence, where x is an integer greater than 0. In the foregoing implementation, the time domain position may be indicated by using a sequence of several bits. This implementation is simple, and system resources are saved. In a possible implementation, a value of x is 4, 5, or 6. During specific implementation, the sequence in this embodiment may be any one of the following: a longest linear feedback shift register m-sequence, a constant amplitude zero auto-correlation ZC sequence, a pseudo-random Gold sequence, or a Boltzmann discrete linear algebraic code Golden sequence.

In some embodiments, the receiving module is configured to receive second information, where the second information is used to indicate information about the sent synchronization signal blocks. After receiving the second information, the terminal device may determine whether all the synchronization signal blocks sent by the network device are received. If some synchronization signal blocks are not received, the terminal device may determine, based on the foregoing determined time domain positions, a synchronization signal block that is not received.

In this embodiment of this application, the second information may be beam group information. The beam group information may be represented by using fields whose lengths are N bits and M bits respectively, where the field with the N bits represent sent synchronization signal block groups, and the field with the M bits are synchronization signal blocks in each sent synchronization signal block group. During specific implementation, N is 16 and M is 16; N is 16 and M is 8; N is 8 and M is 16; or N is 11 and M is 11. This indication manner is simple and convenient, and has relatively high implementability and flexibility. In some embodiments, a receive end of the synchronization signal blocks can clearly determine whether a quantity of received synchronization signal blocks is correct.

In the first aspect to the fourth aspect and various embodiments of the first aspect to the fourth aspect, if T is 12, m is an integer in [1, 8], and a value of any start symbol index in s1, s2, and sm is any value in [1, 9]; if T is 24, m is an integer in [1, 8], and a value of any start symbol index in s1, s2, . . . , and sm is any value in [1, 22]; if T is 48, m is an integer in [1, 16], and a value of any start symbol index in s1, s2, . . . , and sm is any value in [1, 44]; or if T is 96, m is an integer in [1, 32], and a value of any start symbol index in s1, s2, . . . , and sm is any value in [1, 90].

In the first aspect to the fourth aspect and various embodiments of the first aspect to the fourth aspect, a value of n is determined by a time period, and K2 is a length of the time period. In a range of a time period formed by K2 time units, there are K1 time units used to transmit the synchronization signal blocks. In other words, within a complete time domain range, in addition to a slot (SSB slot for short) for transmitting a synchronization signal block, there are some slots (non-SSB slot for short) that are not used for transmitting a synchronization signal block. These non-SSB slots can be used for uplink and downlink transmission. When there are a larger quantity of non-SSB slots, more uplink information can be transmitted.

In a specific implementation scenario, the time period may include but is not limited to the following cases: K2 is 5 and K1 is 4; K2 is 10 and K1 is 8; K2 is 20 and K1 is 16; or K2 is 40 and K1 is 32. A smaller slot granularity may take into account a shorter uplink-downlink period, and a larger slot granularity may take into account an uplink-downlink period with a smaller subcarrier spacing.

In the first aspect to the fourth aspect and various embodiments of the first aspect to the fourth aspect, the time domain positions are {s1, s2, s3}+n×12. In the solution provided in this embodiment, three synchronization signal blocks may be designed in each slot. This may be applied to an existing case in which each synchronization signal block occupies four symbols. In this case, a format of a frequency domain position of a synchronization signal block does not need to be additionally designed, and an existing manner can be used, having strong adaptability to the current situation. In some embodiments, each synchronization signal block occupies fewer than four symbols. In this case, a time domain position and a frequency domain position of the synchronization signal block meeting a requirement may be designed according to a requirement, having relatively high flexibility and/or scalability.

In some embodiments, regarding the time domain positions of the three synchronization signal blocks, s1 is 2, s2 is 5, and s3 is 8; or s1 is 3, s2 is 6, and s3 is 9. In some embodiments, one slot may be used as a time unit (e.g., a total of 12 symbols). In some embodiments, some symbol positions are reserved before s1 in the slot, and some symbol positions may be reserved after s3. These reserved symbol positions may be used for uplink and downlink transmission or uplink and downlink switching, facilitating stable transmission and smooth switching of uplink and downlink signals in the time unit.

In some embodiments, regarding the time domain positions of the three synchronization signal blocks, a value of n is: any integer in 0 to 43; any integer in 0 to 54 except values with single digits being 4 and 9; or any integer in 0 to 54 except values with single digits being 8 and 9. In some embodiments, the time unit corresponding to the index corresponding to the value of n is used as an SSB slot, to transmit a synchronization signal block, and/or time units corresponding to indexes of some values removed when n is set are used as non-SSB slots, to transmit uplink and downlink data (for example, a PDCCH) or to perform (e.g., execute, implement) uplink and downlink signal switching. In some embodiments, SSB slots may be consecutively set to have more compact SSB sending slots, and/or SSB measurement duration is reduced to reduce measurement power consumption. In some embodiments, SSB slots and/or non-SSB slots may be spaced, in other words, SSBs are not exactly consecutive. In this case, uplink and/or downlink signals may be transmitted or switched in one or more non-SSB slots for transmitting the synchronization signal blocks, so that uplink and/or downlink information can be stably transmitted or switched during transmission of the synchronization signal blocks.

In the first aspect to the fourth aspect and various embodiments of the first aspect to the fourth aspect, the time domain positions are {s1, s2}+n×12. In some embodiments, two synchronization signal blocks are designed in each slot. This may be applied to an existing case in which each synchronization signal block occupies four symbols. In this case, a format of a frequency domain position of a synchronization signal block does not need to be additionally designed, and an existing manner can be used, having strong adaptability to the current situation. In some embodiments, each synchronization signal block occupies fewer than four symbols and/or each synchronization signal block occupies more than four symbols and fewer than or equal to six symbols. In this case, a time domain position and/or a frequency domain position of the synchronization signal block meeting a requirement of this design may be designed according to a requirement, having relatively high flexibility and/or scalability.

For the foregoing design of the time domain positions of the two synchronization signal blocks, a value of s1 is one of 2, 3, 4, 5, and 6, a value of s2 is one of 5, 6, 7, and 8, and a difference between the value of s2 and the value of s1 is greater than or equal to a quantity of symbols occupied by the SSB. The two implementations provided in this embodiment are designed by using one slot as a time unit (a total of 12 symbols). In this design, some symbol positions are reserved before s1 in the slot, and some symbol positions may be reserved or may not be reserved after s2. These reserved symbol positions may be used for uplink and downlink transmission or uplink and downlink switching, facilitating stable transmission and smooth switching of uplink and downlink signals in the time unit.

For the foregoing design of the time domain positions of the two synchronization signal blocks, a value of n is: any integer in 0 to 78 except values with single digits being 8 and 9; any integer in 0 to 78 except values with single digits being 5 and 9; any integer in 0 to 157; any integer in 0 to 157 except values with single digits being 8 and 9; any integer in 0 to 157 except values with single digits being 4 and 9; or any integer in 0 to 157 except values with single digits being 6, 7, 8, and 9. In the solution provided in this embodiment, the time unit corresponding to the index corresponding to the value of n is used as an SSB slot, to transmit a synchronization signal block, and time units corresponding to indexes of some values removed when n is set are used as non-SSB slots, to transmit uplink and downlink data (for example, a PDCCH) or to perform uplink and downlink signal switching. Based on this design, SSB slots may be consecutively set to have more compact SSB sending slots, and SSB measurement duration is reduced to reduce measurement power consumption. In some embodiments, SSB slots and non-SSB slots may be spaced, in other words, SSBs are not exactly consecutive. In this case, uplink and downlink signals may be transmitted or switched in one or more non-SSB slots for transmitting the synchronization signal blocks, so that uplink and downlink information can be stably transmitted or switched during transmission of the synchronization signal blocks.

In the first aspect to the fourth aspect and various possible designs of the first aspect to the fourth aspect, the time domain positions are {s1, s2, s3, s4}+n×24. In the foregoing design solution provided in this embodiment, four synchronization signal blocks are designed in each slot. This can be applied to a case in which each synchronization signal block occupies fewer than or equal to three symbols. In this manner, each symbol occupied by the synchronization signal block may be used to separately transmit one type of signal. In some embodiments. this facilitates stable transmission of the synchronization signal block, and can simplify a design of a frequency domain position of the synchronization signal block. In some embodiments, a time domain position of the synchronization signal block may be designed according to a requirement when a quantity of symbols ranges from 1 to 3.

For the foregoing design of the time domain positions of the four synchronization signal blocks, s1 is 2, s2 is 6, s3 is 14, and s4 is 18; s1 is 1, s2 is 5, s3 is 13, and s4 is 17; or s1 is 3, s2 is 7, s3 is 15, and s4 is 19. In the foregoing several designs provided in this embodiment, a value of sm (m=4) is designed by using two slots as one time unit (24 symbols in total). In this design, more symbols are reserved for uplink and downlink data transmission, facilitating stable transmission of uplink and downlink data in the time unit.

For the foregoing design of the time domain positions of the four synchronization signal blocks, a value of n is: any integer in 0 to 39; any integer in 0 to 39 except values with single digits being 4 and 9; any integer in 0 to 79; or any integer in 0 to 79 except values with single digits being 4 and 9. In the solution provided in this embodiment, the time unit corresponding to the index corresponding to the value of n is used as an SSB slot, to transmit a synchronization signal block, and time units corresponding to indexes of some values removed when n is set are used as non-SSB slots, to transmit uplink and downlink data (for example, a PDCCH) or to perform uplink and downlink signal switching. Based on this design, SSB slots may be consecutively set to have more compact SSB sending slots, and SSB measurement duration is reduced to reduce measurement power consumption. In some embodiments, SSB slots and non-SSB slots may be spaced, in other words, SSBs are not exactly consecutive. In this case, uplink and downlink signals may be transmitted or switched in one or more non-SSB slots for transmitting the synchronization signal blocks, so that uplink and downlink information can be stably transmitted or switched during transmission of the synchronization signal blocks.

In the first aspect to the fourth aspect and various possible designs of the first aspect to the fourth aspect, when the synchronization signal block occupies three symbols, a synchronization signal block design is as follows: resource blocks corresponding to the first symbol are used to carry a primary synchronization signal PSS and a physical broadcast channel PBCH resource block carrying the PBCH are located at two ends of resource blocks carrying the PSS; resource blocks corresponding to the second symbol are used to carry the PBCH; and resource blocks corresponding to the third symbol are used to carry a secondary synchronization signal SSS and the PBCH, and resource blocks carrying the PBCH are located at two ends of resource blocks carrying the SSS. In this implementation, this embodiment provides a synchronization signal block sending manner different from that in current technology. To be specific, a synchronization signal block occupies only three symbols, and a PSS, an SSS, and a PBCH are sent by using the three symbols. Compared with an existing manner in which a synchronization signal block is sent by using four symbols, this implementation saves symbol resources and improves data sending efficiency.

According to embodiments of a fifth aspect, this application provides a network device, including modules, components, or circuits configured to implement the synchronization signal transmission method in the first aspect and the possible designs of the first aspect.

According to embodiments of a sixth aspect, this application provides a terminal device, including modules, components, or circuits configured to implement the synchronization signal transmission method in the second aspect and the possible designs of the second aspect.

According to embodiments of a seventh aspect, this application provides a network device, including a processor, a memory, and a transceiver. The processor is configured to control the transceiver to receive and send a signal, the memory is configured to store computer programs or instructions, and the processor is configured to invoke the computer programs or the instructions from the memory and run the computer programs or the instructions, so that the network device performs the synchronization signal transmission method in the first aspect and the possible designs of the first aspect.

According to embodiments of an eighth aspect, this application provides a terminal device, including a processor, a memory, and a transceiver. The processor is configured to control the transceiver to receive and send a signal, the memory is configured to store computer programs or instructions, and the processor is configured to invoke the computer programs or the instructions from the memory and run the computer programs or the instructions, so that the terminal device performs the synchronization signal transmission method in the second aspect and the possible designs of the second aspect.

According to embodiments of a ninth aspect, this application provides a communications apparatus. The communications apparatus has functions, of the network device, implementing any possible implementation of the first aspect. The functions may be implemented by hardware, or may be implemented by hardware executing corresponding software. The hardware or the software includes one or more units corresponding to the functions.

According to embodiments of a tenth aspect, this application provides a communications apparatus. The communications apparatus has functions, of the terminal device, implementing any possible implementation of the second aspect. The functions may be implemented by hardware, or may be implemented by hardware executing corresponding software. The hardware or the software includes one or more units corresponding to the functions.

According to embodiments of an eleventh aspect, this application provides a computer-readable storage medium. The computer-readable storage medium stores computer programs. When the computer programs are run on a computer, the computer is enabled to perform the synchronization signal transmission method in the first aspect and the possible designs of the first aspect.

According to embodiments of a twelfth aspect, this application provides a computer-readable storage medium. The computer-readable storage medium stores computer programs. When the computer programs are run on a computer, the computer is enabled to perform the synchronization signal transmission method in the second aspect and the possible designs of the second aspect.

According to embodiments of a thirteenth aspect, this application provides a computer program product. The computer program product includes computer programs or instructions, the computer programs or the instructions are stored in a readable storage medium. At least one processor of a network device may read the computer programs or the instructions from the readable storage medium, and the at least one processor executes the computer programs or the instructions, so that the network device implements the synchronization signal transmission method in the first aspect and the possible designs of the first aspect.

According to embodiments of a fourteenth aspect, this application provides a computer program product. The computer program product includes computer programs or instructions, the computer programs or the instructions are stored in a readable storage medium. At least one processor of a network device may read the computer programs or the instructions from the readable storage medium, and the at least one processor executes the computer programs or the instructions, so that the network device implements the synchronization signal transmission method in the second aspect and the possible designs of the second aspect.

According to embodiments of a fifteenth aspect, this application provides a chip, including a processor. The processor is configured to read and execute computer programs or instructions stored in a memory, to perform the synchronization signal transmission method in the first aspect and the possible designs of the first aspect.

In some embodiments, the chip includes the memory, and the memory and the processor are connected by using a circuit or a wire. In some embodiments, the chip may include a communications interface. The processor is connected to the communications interface. The communications interface is configured to receive data and/or information that needs to be processed. The processor obtains the data and/or the information from the communications interface, processes the data and/or the information, and outputs a processing result by using the communications interface. The communications interface may be an input/output interface.

According to embodiments of a sixteenth aspect, this application provides a chip, including a processor. The processor is configured to read and execute computer programs or instructions stored in a memory, to perform the synchronization signal transmission method in the second aspect and the possible designs of the second aspect.

In some embodiments, the chip includes the memory, and the memory and the processor are connected by using a circuit or a wire. In some embodiments, the chip may include a communications interface. The processor is connected to the communications interface. The communications interface is configured to receive data and/or information that needs to be processed. The processor obtains the data and/or the information from the communications interface, processes the data and/or the information, and outputs a processing result by using the communications interface. The communications interface may be an input/output interface.

According to embodiments of a seventeenth aspect, this application provides a communications system, including the network device according to any one of the third aspect, the fifth aspect, or the seventh aspect, and the terminal device according to any one of the fourth aspect, the sixth aspect, or the eighth aspect.

It can be learned that in the foregoing aspects, a time domain position of a synchronization signal block is designed for a scenario in which each slot includes T symbols, so that the synchronization signal block can be sent in a time domain position that meets the foregoing design. This resolves a conflict between an existing time domain position design solution of a synchronization signal block and different implementation scenarios in which each slot includes symbols whose quantity is not 14, meets a synchronization signal block sending requirement in an application scenario of a high-frequency technology to some extent, and improves stability and/or flexibility of data sending.

BRIEF DESCRIPTION OF DRAWINGS

FIG. 1 is a schematic diagram of an application scenario, according to some embodiments;

FIG. 2 is a schematic flowchart of a synchronization signal transmission method, according to some embodiments;

DESCRIPTION OF EMBODIMENTS

Figure 3:
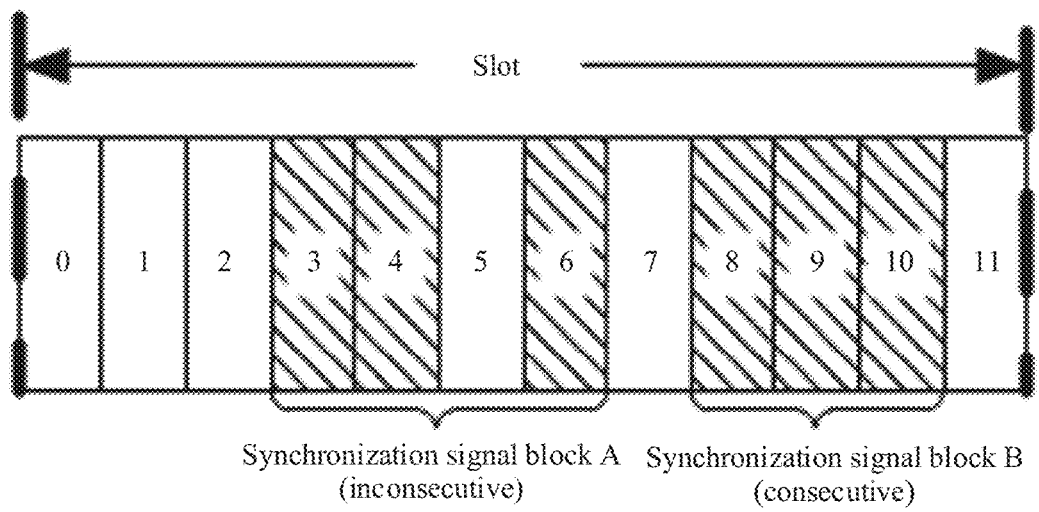
FIG. 3 is a schematic diagram showing whether synchronization signal blocks are consecutive, according to some embodiments.

Terms used in implementations of this application are merely intended to explain specific embodiments of this application, and are not intended to limit this application.

A specific application scenario of the embodiments of this application is a synchronization signal block (SSB) transmission scenario.

In the embodiments of this application, SSB is short for synchronization signal/physical broadcast channel block. An SSB includes at least one of a PSS, an SSS, a PBCH, and a DMRS of a PBCH. For example, any SSB may include only a PSS and an SSS, or any SSB may include only a PBCH and a PSS, or any SSB may include only a PBCH and an SSS.

In a wireless communications network, energy for transmitting a signal is usually limited in a beam direction by using a beamforming technology, to improve signal sending and receiving efficiency. First, a base station needs to match a transmit beam with a receive beam, so that a gain from a transmit end to a receive end is maximized, thereby obtaining relatively high communication efficiency. In some embodiments, to achieve full coverage as much as possible, the base station may need to perform beam sweeping. In some embodiments, because an SSB is received in an idle mode (a basic integrated development environment) and a paging message is also received in the idle mode, the paging message and the SSB may be sent by using a same beam, that is, the SSB and the paging message have a quasi co-location (QCL) relationship. Their QCL relationship may be that the SSB and the paging message have any one or more of a same Doppler shift, a same Doppler spread, a same average gain, a same average delay, a same delay spread, and a same spatial domain receive parameter. A terminal device wakes up in advance before receiving the paging message, and needs to train a beam by using the SSB, that is, receive an SSB signal.

However, with development of high-frequency technologies, for example, an E band technology, a base station needs to use a larger subcarrier spacing, for example, 480 kHz or 960 kHz. However, a larger subcarrier spacing causes a narrower coverage area of the base station. In this case, the base station needs to use a longer cyclic prefix (CP), for example, an extended cyclic prefix (ECP), to reduce interference. However, using the ECP causes a decrease in a quantity of symbols in each slot.

For example, a length of a normal CP is 144 sampling intervals (denoted as a TS, where a value of the TS is a ratio of a time to a quantity of points), and a length of an ECP may be 512 TS. For the CP with the 144 TSs, a coverage area is 44 m at a subcarrier spacing of 480 kHz, and a coverage area is 88 m at a subcarrier spacing of 960 kHz. As a result, the coverage area of the base station is reduced. When the ECP is used, the coverage area of the base station may be expanded to 156 m and 313 m. This can expand the coverage area of the base station. However, the ECP leads to a decrease in a quantity of symbols in one slot. When the original CP with the 144 TSs is used, each slot includes 14 symbols. When the ECP with the 512 TSs is used, each slot includes only 12 symbols. That is, using the ECP reduces a quantity of symbols in each slot.

In this case, there is an important problem in a current technology: A time domain position of an existing SSB is designed based on that each slot includes 14 symbols instead of 12 symbols. An existing SSB pattern is not applicable to a scenario in which each slot includes 12 symbols.

In a data transmission process, sufficient time is required for transmission on both an uplink and a downlink, that is, a specific slot is required for transmission or signal switching. Therefore, when there are fewer symbols in the slot, a time reserved for an uplink signal or a switching signal becomes shorter. This may cause interruption of transmission of the uplink signal and the switching signal.

Therefore, to adapt to scenarios in which there are different quantities of symbols in each slot that are different from 14 symbols, a time domain position of an SSB needs to be redesigned, to avoid impact on an uplink signal or a switching signal.

The technical solutions provided in this application are intended to resolve the foregoing technical problem in the current technology, and provides the following solution: A time domain position of a synchronization signal block in this scenario is designed based on a quantity of 12 symbols in a time unit, and the synchronization signal block is sent in the time domain position.

The technical solutions provided in the embodiments of this application may be applied to various communications systems. FIG. 1 is a schematic diagram of an application scenario, according to some embodiments. As shown in FIG. 1, a communications system mainly includes a network device 11 and a terminal device 12.

(1) The network device 11 may be a network side device, for example, a wireless fidelity (Wi-Fi) access point AP, or a base station for next generation communication. For example, the network device may be a base transceiver station (BTS for short) and/or a base station controller in GSM or CDMA, a NodeB (NB for short) and/or a radio network controller (RNC for short) in WCDMA, an evolved NodeB (eNB or eNodeB for short) in LTE, a relay station or an access point, or a gNB in a 5G network. This is not limited in this application. In some embodiments, the network device may alternatively be a small cell, a micro cell, or a transmission reference point (TRP), or may be a relay station, an access point, a vehicle-mounted device, a wearable device, or the like. In the embodiments, communications systems of different communication standards have different base stations. For ease of differentiation, a base station in a 4G communications system is referred to as an LTE eNB, a base station in a 5G communications system is referred to as an NR gNB, and a base station that supports both a 4G communications system and a 5G communications system is referred to as an eLTE eNB. These names are merely for ease of differentiation, and do not have limitation meanings.

(2) The terminal device 12 may be referred to as user equipment (UE) or a terminal, and is a device that provides a user with voice and/or data connectivity. The terminal 12 may be a wireless terminal or a wired terminal. The wireless terminal may refer to a device that provides a user with voice and/or another service data connectivity, a handheld device with a wireless connection function, or another processing device connected to a wireless modem. The wireless terminal may communicate with one or more core network devices through a radio access network (RAN for short). The wireless terminal may be a mobile terminal, such as a mobile phone (sometimes referred to as a "cellular" phone) and a computer with a mobile terminal, for example, may be a portable, pocket-sized, handheld, computer built-in, or in-vehicle mobile apparatus, which exchanges voice and/or data with the radio access network. For another example, the wireless terminal may alternatively be a device such as a personal communications service (PCS for short) phone, a cordless telephone set, a session initiation protocol (SIP for short) phone, a wireless local loop (WLL for short) station, or a personal digital assistant (PDA for short). The wireless terminal may be referred to as a system, a subscriber unit, a subscriber station, a mobile station, a mobile terminal, a remote station, a remote terminal, an access terminal, a user terminal, a user agent, a user device (or User Equipment). This is not limited herein. In some embodiments, the terminal 12 may alternatively be a tablet, a notebook computer, a palmtop computer, a mobile internet device (MID), and a wearable device such as a smartwatch, a smart band, or a pedometer.

(3) "A plurality of" indicates two or more, and another quantifier is similar to this. The term "and/or" describes a correspondence between associated objects and represents that three relationships may exist. For example, A and/or B may represent the following three cases: Only A exists, both A and B exist, and only B exists. The character "/" usually indicates an "or" relationship between the associated objects.

It should be noted that, a quantity and types of terminal devices 12 included in the communications system shown in FIG. 1 are merely examples, and this embodiment of this application is not limited thereto. For example, more terminal devices 12 that communicate with the network device 11 may be further included. For brevity, details are not described in the accompanying drawings. In some embodiments, in the communications system shown in FIG. 1, although the network device 11 and the terminal device 12 are shown, the communications system may include but is not limited to the network device 11 and the terminal device 12, for example, may include a core network node or a device configured to carry a virtualized network function. This is obvious to a person skilled in the art, and details are not described herein.

Any of the embodiments of this application may be applied not only to a 5th generation wireless communications system, that is, the 5G communications system, but also to another system that may appear in the future, for example, a next-generation Wi-Fi network or a 5G internet of vehicles.

It should be noted that, with continuous evolution of the communications system, names of the foregoing network elements may change in another system that may appear in the future. In this case, the solutions provided in the embodiments of this application are also applicable.

The following uses specific embodiments to describe in detail the technical solutions of this application and how the foregoing technical problem is resolved by using the technical solutions of this application. The following several specific embodiments may be combined with one another. A same or similar concept or process may not be described in detail in some embodiments. The following describes the embodiments of this application with reference to the accompanying drawings.

FIG. 2 is a schematic flowchart of a synchronization signal transmission method, according to some embodiments. The method includes the following operations.

S202. A network device determines time domain positions for sending m synchronization signal blocks, where the time domain positions are one or more positions in {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157].

S204. The network device sends the synchronization signal blocks to a terminal device in the time domain positions of the synchronization signal blocks.

In some embodiments, a manner of setting the time domain position of the synchronization signal block provided in this embodiment of this application is not only applicable to a scenario with an existing subcarrier spacing, but also applicable to a scenario with a relatively large subcarrier spacing, for example, a scenario in which a subcarrier spacing is 240 kHz, 480 kHz, 960 kHz, or 1920 kHz, providing relatively high flexibility.

The following describes, in some embodiments, the time domain position determined by the network device. To avoid ambiguity, terms used in this application are first explained.

A time unit is a time domain range of a unit time length, and a specific range of the time unit may be determined according to a requirement. For example, the time unit may be one or more slots, or may be one or more subframes.

A quantity of symbols of an SSB is a quantity of symbols occupied when the synchronization signal block is transmitted. The quantity of symbols of the SSB is not particularly limited in this application. The SSB may include four symbols in the current technology, or the SSB may be configured with another quantity of symbols in an actual scenario. For example, the quantity of symbols of the SSB may be 4, 3, 2, 1, or the like.

A start symbol index is an index position of the first symbol occupied when the synchronization signal block is transmitted.

A total quantity of symbols is a sum of quantities of symbols in a time unit. For example, if each slot includes 12 symbols, and a time unit is one slot, a total quantity of symbols is 12. If the time unit is five slots, the total quantity of symbols is 60.

In this application, in a process of transmitting a synchronization signal block, to minimize impact on uplink and downlink signal transmission or switching, some symbols usually need to be reserved in a slot. That is, in a time unit, a synchronization signal block usually does not occupy all symbols (there is a special case, which is not discussed herein). Therefore, a value of m is affected by a quantity of symbols in a time unit, and varies with a value of T.

For ease of understanding, this application provides the following several possible implementations:

if T is 12, m is an integer in [1, 8], and a value of any start symbol index in s1, s2, . . . , and sm is any value in [1, 9];

if T is 24, m is an integer in [1, 8], and a value of any start symbol index in s1, s2, . . . , and sm is any value in [1, 22];

if T is 48, m is an integer in [1, 16], and a value of any start symbol index in s1, s2, . . . , and sm is any value in [1, 44]; or if T is 96, m is an integer in [1, 32], and a value of any start symbol index in s1, s2, . . . , and sm is any value in [1, 90].

In some embodiments, before the time domain position of the synchronization signal block is determined, a quantity of symbols for the synchronization signal block and a quantity of synchronization signal blocks in each time unit may need to be determined.

In a specific implementation scenario, if one slot is used as one time unit, considering that a synchronization signal block usually occupies four symbols in the current technology, a quantity of synchronization signal blocks in one slot may be 1 or 2. This can reserve more symbols for uplink and downlink data, and minimize, during SSB transmission, impact on uplink and downlink signal transmission or switching.

As described above, the start symbol index is used to represent an index position of the first symbol occupied by a synchronization signal block within a time unit, that is, an index position of a start symbol in a slot. It should be noted that, in this application, symbol indexes are numbered starting from 0. Therefore, although the symbol index is used to indicate a symbol position, there is a slight difference in number representation. For example, when the symbol index is 0, the symbol index is used to indicate the first symbol; when the symbol index is 4, the symbol index is used to indicate the fifth symbol; when the symbol index is 11, the symbol index is used to indicate the twelfth symbol. In this application, the symbol indexes are numbered starting from 0, and details are not described herein again.

In some embodiments, when there are at least two SSBs in a time unit, a time domain relationship between the SSBs may need to be considered. In some embodiments, the time domain relationship between the SSBs may include: whether symbols occupied by any SSB are consecutive, whether the SSBs are consecutive, whether positions occupied by the SSBs in a slot are in the front, in the back, or in the middle (relative positions of symbols sequentially arranged in a slot relative to the entire slot), and the like.

It can be learned that in a specific implementation process, symbols occupied by any synchronization signal block in a time unit may be consecutive, or may be spaced by one or more symbols. In an implementation scenario in which an SSB is used as a synchronization signal block, in a manner of consecutively setting symbols, SSBs can be more compact, and more symbols can be reserved for uplink data transmission. For example, referring to a schematic diagram of synchronization signal blocks shown in FIG. 3, a synchronization signal block A and a synchronization signal block B in FIG. 3 each occupy three symbols in a slot. The synchronization signal block A occupies symbols 3, 4, and 6, and the synchronization signal block B occupies symbols 8, 9, and 10. As shown in FIG. 3, there is no interruption between the symbols occupied by the synchronization signal block B in the slot, and therefore the symbols are consecutively set. However, there is an interval of one symbol between the symbols occupied by the synchronization signal block A, and therefore the symbols are set at intervals. In this case, start symbol indexes of the synchronization signal block A may be represented by segment.

In the following content, for ease of description, this application is described by using the manner of consecutively setting the symbols occupied by the synchronization signal block B shown in FIG. 3 as an example. It can be learned that the manner of inconsecutively setting the symbols occupied by the synchronization signal block A shown in FIG. 3 may be transformed based on the design principle of this application.

In some embodiments, whether two adjacent synchronization signal blocks in a time unit are consecutive is not particularly limited in this embodiment of this application.

In this case, in a specific implementation process, two adjacent synchronization signal blocks in a time unit may be consecutive. For example, two adjacent SSBs may be consecutively set. This can support ultra-reliable low-latency communication (URLLC), for an uplink data transmission gap or an uplink transmission gap.

In some embodiments, in another specific implementation process, there may be at least one symbol between two adjacent synchronization signal blocks in a time unit. This configuration manner is equivalent to reserving symbols between different SSBs. These reserved symbols can be used for URLLC preemption, to reduce a URLLC transmission latency. FIG. 3 is still used as an example. In FIG. 3, the synchronization signal block A and the synchronization signal block B are separated by a symbol 7, and the two synchronization signal blocks are inconsecutively set. The schematic signal diagram of FIG. 3 is merely an example, is used to describe a manner of setting a synchronization signal block, and is not used to limit this application.

On one hand, whether the first synchronization signal block in the time unit starts from the first symbol (a symbol index is 0) is not particularly limited in this embodiment of this application. In some embodiments, one or more symbols may be reserved before the first synchronization signal block in a time unit. In a time unit, an index of a start symbol of a time domain position of a synchronization signal block may be any one or more of 1, 2, 3, 4, 5, 6, 7, or 8. In other words, in the time unit, at least one symbol position (0) is reserved before the first SSB, and the reserved symbol may be used for physical downlink control channel (PDCCH) transmission. In some embodiments, a larger quantity of reserved symbols indicates more symbols reserved for the PDCCH, which are more favorable to downlink data transmission.

On the other hand, in this embodiment of this application, no special limitation is imposed on whether the last synchronization signal block in the time unit ends with the last symbol (for example, the time unit is one slot, and as shown in FIG. 3, a symbol index of the last symbol is 11). In some embodiments, one or more symbols may be reserved after the last synchronization signal block in the time unit, and these symbols can be used for uplink transmission or switching.

In some embodiments, one or more SSBs configured in a time unit may be configured to occupy a middle position of the time unit as much as possible. In other words, there are reserved symbols before and after these SSBs, and the reserved symbols are not used to carry symbols of the synchronization signal blocks.

For ease of understanding, an example in which one slot includes 12 symbols is used below. This application provides the following several manners of configuring a time domain position of a synchronization signal block.

In a first possible implementation scenario, an SSB occupies four symbols. If one slot is used as one time unit, there are the following three configuration manners:

In a first configuration manner, there are three SSBs in one slot.

In this case, if one slot is used as one time unit (T=12), time domain positions of the synchronization signal blocks are {s1, s2, s3}+n×12. In other words, the three SSBs occupy all 12 symbols in the slot, where s1 is 0, s2 is 4, and s3 is 8. In this configuration manner, three synchronization signal blocks are designed in each slot. This can be applied to an existing case in which each synchronization signal block occupies four symbols. In this case, a format of a frequency domain position of a synchronization signal block does not need to be additionally designed, and an existing manner can be used, having strong adaptability to the current situation. However, it should be noted that, in this implementation, no symbol used for uplink and downlink signal transmission or switching is reserved in the time unit. Therefore, the uplink and downlink signal transmission or switching may be affected. During specific implementation, a non-SSB slot and an SSB slot may be crossed, and the non-SSB slot is used for the uplink and downlink signal transmission or switching.

Therefore, during actual implementation, a plurality of slots, for example, two slots, may be used as one time unit. In this case, the time domain positions of the synchronization signal blocks may be represented as {s1, s2, s3}+n×12i. i represents a quantity of slots in a time unit, and a value of i is an integer greater than 1. This implementation has relatively little impact on the uplink and downlink signal transmission or switching.

In a second configuration manner, if two SSBs exist in one slot, and one slot is used as one time unit (T=12), time domain positions of the synchronization signal blocks may be represented as {s1, s2}+n×12. s1 ranges from 0 to 4, s2 ranges from 4 to 8, and a difference between a value of s2 and a value of s1 is greater than or equal to 4. In this case, setting manners may include but are not limited to the following:

When s1 is a symbol 0, s2 is a symbol 4, 5, 6, 7, or 8.

In some embodiments, when s1 is a symbol 1, s2 is a symbol 5, 6, 7, or 8.

In some embodiments, when s1 is a symbol 2, s2 is a symbol 6, 7, or 8.

In some embodiments, when s1 is a symbol 3, s2 is a symbol 7 or 8.

In some embodiments, when s1 is a symbol 4, s2 is a symbol 8.

In a third configuration manner, if one SSB exists in one slot, and one slot is used as one time unit (T=12), time domain positions of the synchronization signal blocks may be represented as {s1}+n×12. In this case, s1 is any one of 0 to 8. In this case, the SSB may be located in any position in the time unit, and all symbols other than a symbol occupied by the SSB may be used for uplink and downlink signal transmission or switching.

In a second possible implementation scenario, the SSB occupies three symbols. In this case, there are the following four configuration manners:

In a first configuration manner, there are four SSBs in one slot. As described above, if one slot is used as one time unit, uplink and downlink signal transmission or switching may be affected. In this case, i slots may be used as one time unit.

In some embodiments, two slots are used as one time unit (T=24). In this case, time domain positions of the synchronization signal blocks may be represented as {s1, s2, s3, s4}+n×24. In this design, a manner of setting the time domain positions of the synchronization signal blocks may include but is not limited to the following several manners:

s1 is 2, s2 is 6, s3 is 14, and s4 is 18;
s1 is 1, s2 is 5, s3 is 13, and s4 is 17; or
s1 is 3, s2 is 7, s3 is 15, and s4 is 19.

It can be learned that during actual implementation, there may be a plurality of implementations, and details are not described again.

In a second configuration manner, if three SSBs exist in one slot, and one slot is used as one time unit (T=12), time domain positions of the synchronization signal blocks may be represented as {s1, s2, s3}+n×12. In this case, s1 ranges from 0 to 3, s2 ranges from 3 to 6, s3 ranges from 6 to 9, a difference between a value of s2 and a value of s1 is greater than or equal to 3, and a difference between a value of s3 and the value of s2 is greater than or equal to 3. In this case, setting manners may include but are not limited to the following:

When s1 is 0 and s2 is 3, s3 is 6, 7, 8, or 9. If s3 is 6, an uplink symbol resource or a time gap for uplink and downlink symbol switching may be reserved, to facilitate signal switching. In some embodiments, if a symbol index of the third SSB is 7, 8, or 9, there is a blank symbol between the second SSB and the third SSB. In this case, these blank symbols may be used for URLLC transmission.

In some embodiments, if s1 is 0 and s2 is 4, s3 is 7, 8, or 9.

In some embodiments, if s1 is 0 and s2 is 5, s3 is 8 or 9.

In some embodiments, if s1 is 0 and s2 is 6, s3 is 9.

In some embodiments, if s1 is 1 and s2 is 4, s3 is 7, 8, or 9.

In some embodiments, if s1 is 1 and s2 is 5, s3 is 8 or 9.

In some embodiments, if s1 is 1, 2, or 3, and s2 is 6, s3 is 9.

Figure 4:
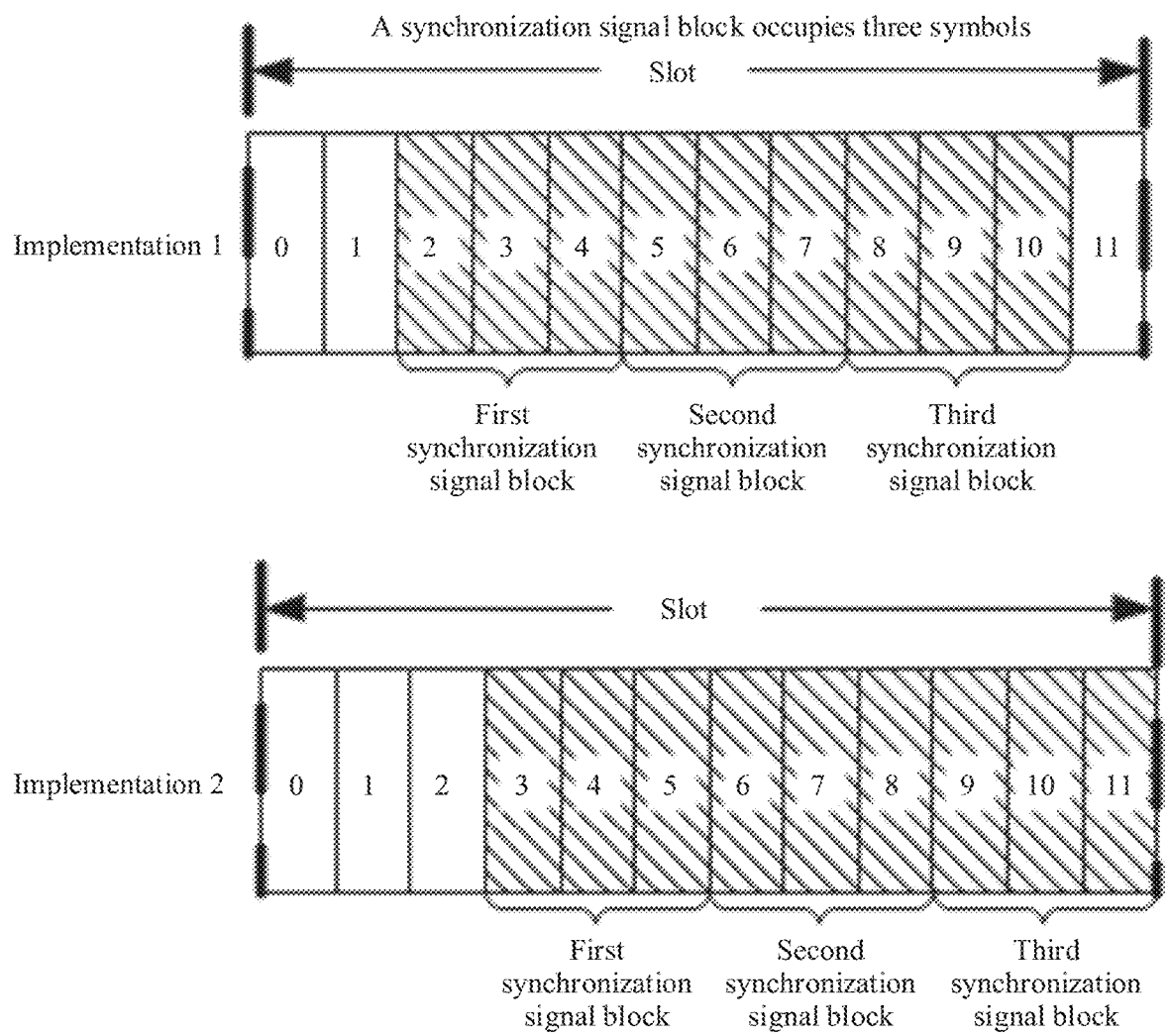
FIG. 4 is a schematic diagram of two time domain position configuration modes, according to some embodiments.

FIG. 4 is a schematic diagram of two time domain position configuration modes, according tom some embodiments. As shown in FIG. 4, in an implementation 1, start symbol indexes of the three SSBs are: s1 is 2, s2 is 5, and s3 is 8. In this implementation scenario, two symbol positions (0 and 1) are reserved before the first SSB, and one symbol is reserved after the third SSB. The reserved three symbols can be used to implement uplink and downlink signal transmission or switching, and have relatively small impact on uplink and downlink signals. In an implementation 2, start symbol indexes of the three SSBs are: s1 is 3, s2 is 6, and s3 is 9. In this implementation scenario, three symbol positions (0, 1, and 2) are reserved before the first SSB. The three reserved symbols can be used to implement uplink and downlink signal transmission or switching, and have relatively small impact on uplink and downlink signals.

In a third configuration manner, if two SSBs exist in one slot, and one slot is used as one time unit (T=12), time domain positions of the synchronization signal blocks may be represented as {s1, s2}+n×12. s1 ranges from 0 to 6, s2 ranges from 3 to 9, and a difference between a value of s2 and a value of s1 is greater than or equal to 3. In this case, setting manners may include but are not limited to the following:

If s1 is 0, s2 is 3, 4, 5, 6, 7, 8, or 9.
In some embodiments, if s1 is 1, s2 is 4, 5, 6, 7, 8, or 9.
In some embodiments, if s1 is 2, s2 is 5, 6, 7, 8, or 9.
In some embodiments, if s1 is 3, s2 is 6, 7, 8, or 9.
In some embodiments, if s1 is 4, s2 is 7, 8, or 9.
In some embodiments, if s1 is 5, s2 is 8 or 9.
In some embodiments, if s1 is 6, s2 is 9.
In some embodiments, a value of s1 is one of 2, 3, 4, 5, and 6, a value of s2 is one of 5, 6, 7, and 8, and a difference between the value of s2 and the value of s1 is greater than or equal to a quantity of symbols occupied by the SSB.

In a fourth configuration manner, if one SSB exists in one slot, and one slot is used as one time unit (T=12), time domain positions of the synchronization signal blocks may be represented as {s1}+n×12. In this case, a start symbol index of the SSB is any one of 0 to 9. In some embodiments, s1 may be any one of 1, 2, 3, 4, 5, 6, 7, or 8.

In a third possible implementation scenario, the SSB occupies two symbols. In this case, there are the following six configuration manners:

In a first configuration manner, there are six SSBs in one slot. In this case, if one slot is used as one time unit (T=12), time domain positions of the synchronization signal blocks may be represented as {s1, s2, s3, s4, s5, s6}+n×12. In this case, the six SSBs occupy all the 12 symbols in the slot. In this case, s1 is 0, s2 is 2, s3 is 4, s4 is 6, s5 is 8, and s6 is 10. As described above, a non-SSB slot and an SSB slot may be crossed, and the non-SSB slot is used for uplink and downlink signal transmission or switching.

Therefore, to reduce adverse impact on uplink and downlink signals, a plurality of slots may be used as one time unit to design a time domain position of a synchronization signal block. Details are not described again.

In a second configuration manner, if five SSBs exist in one slot, and one slot is used as one time unit (T=12), time domain positions of the synchronization signal blocks may be represented as {s1, s2, s3, s4, s5}+n×12. s1 ranges from 0 to 2, s2 ranges from 2 to 4, s3 ranges from 4 to 6, s4 ranges from 6 to 8, s5 ranges from 8 to 10, a difference between a value of s5 and a value of s4, a difference between the value of s4 and a value of s3, a difference between the value of s3 and a value of s2, and a difference between the value of s2 and a value of s1 are all greater than or equal to 2. In this case, setting manners may include but are not limited to the following:

If s1 is 0, s2 is 2, s3 is 4, and s4 is 6, s5 is 8, 9, or 10.
In some embodiments, if s1 is 0, s2 is 2, s3 is 4 or 5, and s4 is 7, s5 is 9 or 10.
In some embodiments, if s1 is 0, s2 is 2, s3 is 4, and s4 is 8, s5 is 10.
In some embodiments, if s1 is 0, s2 is 2, s3 is 5, and s4 is 8, s5 is 10.
In some embodiments, if s1 is 0, s2 is 2, s3 is 6, and s4 is 8, s5 is 10.
In some embodiments, if s1 is 0, s2 is 3, s3 is 5, and s4 is 7, s5 is 9 or 10.
In some embodiments, if s1 is 0, s2 is 3, s3 is 6, and s4 is 8, s5 is 10.
In some embodiments, if s1 is 0, s2 is 4, s3 is 6, and s4 is 8, s5 is 10.
In some embodiments, if s1 is 1, s2 is 3, s3 is 5, and s4 is 7, s5 is 9 or 10.
In some embodiments, if s1 is 1, s2 is 3, s3 is 5, and s4 is 8, s5 is 10.
In some embodiments, if s1 is 1, s2 is 3, s3 is 6, and s4 is 8, s5 is 10.
In some embodiments, if s1 is 1, s2 is 4, s3 is 6, and s4 is 8, s5 is 10.
In some embodiments, if s1 is 2, s2 is 4, s3 is 6, and s4 is 8, s5 is 10.

In a third configuration manner, if four SSBs exist in one slot, and one slot is used as one time unit (T=12), time domain positions of the synchronization signal blocks may be represented as {s1, s2, s3, s4}+n×12. s1 ranges from 0 to 4, s2 ranges from 2 to 6, s3 ranges from 4 to 8, s4 ranges from 6 to 10, and a difference between a value of s4 and a value of s3, a difference between the value of s3 and a value of s2, and a difference between the value of s2 and a value of s1 are all greater than or equal to 2. In this case, setting manners may include but are not limited to the following:

If s1 is 0, s2 is 2, s3 is 4, and s4 is 6, 7, 8, 9, or 10.
In some embodiments, if s1 is 0, s2 is 2, s3 is 5, and s4 is 7, 8, 9, or 10.
In some embodiments, if s1 is 0, s2 is 2, s3 is 6, and s4 is 8, 9, or 10.
In some embodiments, if s1 is 0, s2 is 2, s3 is 7, and s4 is 9 or 10.
In some embodiments, if s1 is 0, s2 is 2, s3 is 8, and s4 is 10.
In some embodiments, if s1 is 0, s2 is 3, s3 is 5, and s4 is 7, 8, 9, or 10.
In some embodiments, if s1 is 0, s2 is 3, s3 is 6, and s4 is 8, 9, or 10.
In some embodiments, if s1 is 0, s2 is 3, s3 is 7, and s4 is 9 or 10.
In some embodiments, if s1 is 0, s2 is 3, s3 is 8, and s4 is 10.
In some embodiments, if s1 is 0, s2 is 4, s3 is 6, and s4 is 8, 9, or 10.
In some embodiments, if s1 is 0, s2 is 4, s3 is 7, and s4 is 9 or 10.
In some embodiments, if s1 is 0, s2 is 4, s3 is 8, and s4 is 10.
In some embodiments, if s1 is 0, s2 is 5, s3 is 7, and s4 is 9 or 10.
In some embodiments, if s1 is 0, s2 is 5, s3 is 8, and s4 is 10.
In some embodiments, if s1 is 0, s2 is 6, s3 is 8, and s4 is 10.

In some embodiments, if s1 is 1, s2 is 3, s3 is 5, and s4 is 7, 8, 9, or 10.

In some embodiments, if s1 is 1, s2 is 3, s3 is 6, and s4 is 8, 9, or 10.

In some embodiments, if s1 is 1, s2 is 3, s3 is 7, and s4 is 9 or 10.

In some embodiments, if s1 is 1, s2 is 3, s3 is 8, and s4 is 10.

In some embodiments, if s1 is 1, s2 is 4, s3 is 6, and s4 is 8, 9, or 10.

In some embodiments, if s1 is 1, s2 is 4, s3 is 7, and s4 is 9 or 10.

In some embodiments, if s1 is 1, s2 is 4, s3 is 8, and s4 is 10.

In some embodiments, if s1 is 1, s2 is 5, s3 is 7, and s4 is 9 or 10.

In some embodiments, if s1 is 1, s2 is 5, s3 is 8, and s4 is 10.

In some embodiments, if s1 is 1, s2 is 6, s3 is 8, and s4 is 10.

In some embodiments, if s1 is 2, s2 is 4, s3 is 6, and s4 is 8, 9, or 10.

In some embodiments, if s1 is 2, s2 is 4, s3 is 7, and s4 is 9 or 10.

In some embodiments, if s1 is 2, s2 is 4, s3 is 8, and s4 is 10.

In some embodiments, if s1 is 2, s2 is 5, s3 is 7, and s4 is 9 or 10.

In some embodiments, if s1 is 2, s2 is 5, s3 is 8, and s4 is 10.

In some embodiments, if s1 is 2, s2 is 6, s3 is 8, and s4 is 10.

In some embodiments, if s1 is 3, s2 is 5, s3 is 7, and s4 is 9 or 10.

In some embodiments, if s1 is 3, s2 is 5, s3 is 8, and s4 is 10.

In some embodiments, if s1 is 3, s2 is 6, s3 is 8, and s4 is 10.

In some embodiments, if s1 is 4, s2 is 6, s3 is 8, and s4 is 10.

In a fourth configuration manner, if three SSBs exist in one slot, and one slot is used as one time unit (T=12), time domain positions of the synchronization signal blocks may be represented as {s1, s2, s3}+n×12. s1 ranges from 0 to 6, s2 ranges from 2 to 8, s3 ranges from 4 to 10, and both a difference between a value of s3 and a value of s2 and a difference between the value of s2 and a value of s1 are greater than or equal to 2. In this case, setting manners may include but are not limited to the following:

If s1 is 0 and s2 is 2, s3 is 4, 5, 6, 7, 8, 9, or 10.

In some embodiments, if s1 is 0 and s2 is 3, s3 is 5, 6, 7, 8, 9, or 10.

In some embodiments, if s1 is 0 and s2 is 4, s3 is 6, 7, 8, 9, or 10.

In some embodiments, if s1 is 0 and s2 is 5, s3 is 7, 8, 9, or 10.

In some embodiments, if s1 is 0 and s2 is 6, s3 is 8, 9, or 10.

In some embodiments, if s1 is 0 and s2 is 7, s3 is 9 or 10.

In some embodiments, if s1 is 0 and s2 is 8, s3 is 10.

In some embodiments, if s1 is 1 and s2 is 3, s3 is 5, 6, 7, 8, 9, or 10.

In some embodiments, if s1 is 1 and s2 is 4, s3 is 6, 7, 8, 9, or 10.

In some embodiments, if s1 is 1 and s2 is 5, s3 is 7, 8, 9, or 10.

In some embodiments, if s1 is 1 and s2 is 6, s3 is 8, 9, or 10.

In some embodiments, if s1 is 1 and s2 is 7, s3 is 9 or 10.

In some embodiments, if s1 is 1 and s2 is 8, s3 is 10.

In some embodiments, if s1 is 2 and s2 is 4, s3 is 6, 7, 8, 9, or 10.

In some embodiments, if s1 is 2 and s2 is 5, s3 is 7, 8, 9, or 10.

In some embodiments, if s1 is 2 and s2 is 6, s3 is 8, 9, or 10.

In some embodiments, if s1 is 2 and s2 is 7, s3 is 9 or 10.

In some embodiments, if s1 is 2 and s2 is 8, s3 is 10.

In some embodiments, if s1 is 3 and s2 is 5, s3 is 7, 8, 9, or 10.

In some embodiments, if s1 is 3 and s2 is 6, s3 is 8, 9, or 10.

In some embodiments, if s1 is 3 and s2 is 7, s3 is 9 or 10.

In some embodiments, if s1 is 3 and s2 is 8, s3 is 10.

In some embodiments, if s1 is 4 and s2 is 6, s3 is 8, 9, or 10.

In some embodiments, if s1 is 4 and s2 is 7, s3 is 9 or 10.

In some embodiments, if s1 is 4 and s2 is 8, s3 is 10.

In some embodiments, if s1 is 5 and s2 is 7, s3 is 9 or 10.

In some embodiments, if s1 is 5 and s2 is 8, s3 is 10.

In some embodiments, if s1 is 6 and s2 is 8, s3 is 10.

In a fifth configuration manner, if two SSBs exist in one slot, and one slot is used as one time unit (T=12), time domain positions of the synchronization signal blocks may be represented as {s1, s2}+n×12. s1 ranges from 0 to 8, s2 ranges from 2 to 10, and a difference between a value of s2 and a value of s1 is greater than or equal to 2. In this case, setting manners may include but are not limited to the following:

If s1 is 0, s2 is 2, 3, 4, 5, 6, 7, 8, 9, or 10.

In some embodiments, if s1 is 1, s2 is 3, 4, 5, 6, 7, 8, 9, or 10.

In some embodiments, if s1 is 2, s2 is 4, 5, 6, 7, 8, 9, or 10.

In some embodiments, if s1 is 3, s2 is 5, 6, 7, 8, 9, or 10.

In some embodiments, if s1 is 4, s2 is 6, 7, 8, 9, or 10.

In some embodiments, if s1 is 5, s2 is 7, 8, 9, or 10.

In some embodiments, if s1 is 6, s2 is 8, 9, or 10.

In some embodiments, if s1 is 7, s2 is 9 or 10.

In some embodiments, if s1 is 8, s2 is 10.

In a sixth configuration manner, if one SSB exists in one slot, and one slot is used as one time unit (T=12), time domain positions of the synchronization signal blocks may be represented as {s1}+n×12. In this case, a start symbol index of the SSB is any one of 0 to 10. An implementation of this configuration manner is the same as that in the foregoing content, and there are many setting manners. Details are not described again.

It should be noted that the foregoing plurality of implementations are designed by using an example in which one slot includes 12 symbols. The foregoing descriptions are merely used to explain this application, but are not used to limit a manner of setting a time unit in this application. In some embodiments, one slot may include another quantity of symbols, for example, 24 symbols.

In some embodiments, one slot is used as one time unit for design. However, this application imposes no special limitation on a quantity of slots in each time unit. As described in the foregoing implementation scenario, one time unit may be one or i slots, and a value of i is an integer greater than 1.

Figure 5:
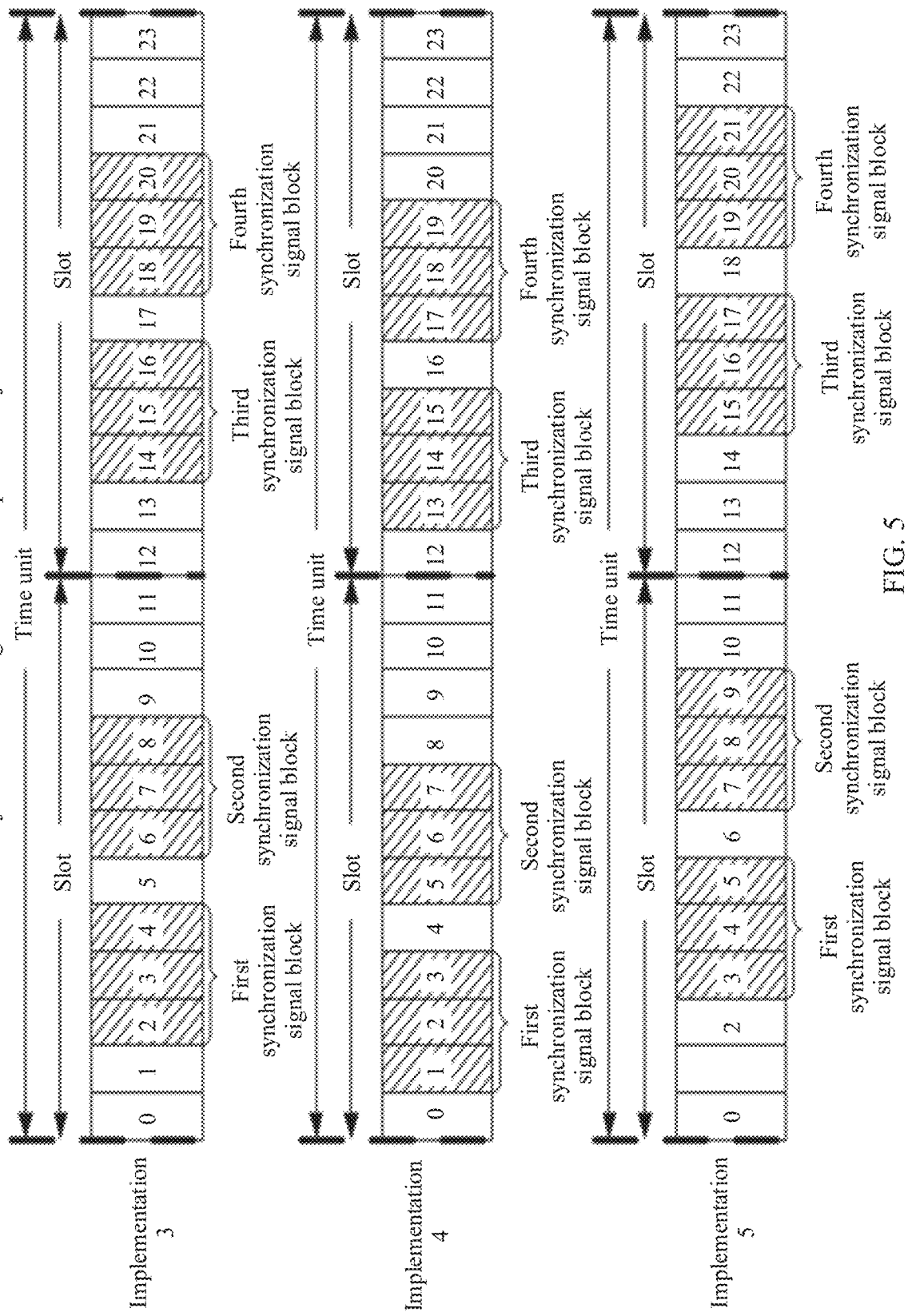
FIG. 5 is a schematic diagram of other three time domain position configuration manners, according to some embodiments.

For ease of understanding, this application provides an implementation of a time domain position when a time unit is two slots. For example, FIG. 5 is a schematic diagram of other three time domain position configuration manners, according to some embodiments. In some embodiments, a time domain position shown in FIG. 5 may be represented as {s1, s2, s3, s4}+n×24. FIG. 5 shows three possible implementations in this scenario. It is assumed that each SSB in the time domain position shown in FIG. 5 occupies three symbols.

In some embodiments, in an implementation 3 shown in FIG. 5, s1 is 2, s2 is 6, s3 is 14, and s4 is 18. In an implementation 4 shown in FIG. 5, s1 is 1, s2 is 5, s3 is 13, and s4 is 17. In an implementation 5 shown in FIG. 5, s1 is 3, s2 is 7, s3 is 15, and s4 is 19. In the three implementations, there is one symbol between an SSB corresponding to s1 and an SSB corresponding to s2, and the symbol may be used for uplink and downlink signal transmission. Likewise, one symbol that can be used for uplink and downlink signal switching or transmission is reserved both between the SSB corresponding to s2 and an SSB corresponding to s3 and between the SSB corresponding to s3 and an SSB corresponding to s4. In some embodiments, sufficient symbols are reserved before the SSB corresponding to s1 and after the SSB corresponding to s4, so that stable uplink and downlink signal transmission can be further ensured.

In some embodiments, in the three implementations shown in FIG. 5, positions of s1 and s3 are corresponding to each other in slots to which s1 and s3 belong, and positions of s2 and s4 are corresponding to each other in slots to which s2 and s4 belong. This is not particularly limited in this application. During specific implementation, if a time unit includes at least two slots, positions, of start symbol indexes of SSBs in all slots may be the same, as shown in FIG. 5; or may be different, and may be set according to a requirement.

In some embodiments, when the time domain positions of the SSBs are determined, a plurality of SSB burst sets may be sent in one period. The SSB burst set may indicate an SSB sent in a half-frame, or indicate an SSB sent during one round of beam sweeping. In other words, a plurality of half-frames are used to send SSBs in one SSB period. Quantities of SSBs in different half-frames are the same, and SSBs in different half-frames are quasi co-located (QCLed). A time offset, referred to as an offset, exists between indexes of same SSBs in two adjacent half-frames. In some embodiments, a configured value of the offset may be some or all values of 5 ms, 15 ms, 10 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 105 ms, 110 ms, 115 ms, 120 ms, 125 ms, 130 ms, 135 ms, 140 ms, 145 ms, 150 ms and 155 ms. The value of the offset may be configured in at least one of radio resource control (RRC) signaling, a media access control-control element (MAC-CE), or downlink control information (DCI), or may be configured in system information, for example, configured in a system information block (SIB) 1, a SIB2, or SIB3.

Based on this, the network device may configure a specific half-frame position in each half-frame or a specific half-frame position in an SSB period, and a specific value that may be configured is the same as one of the values of the offset. When configuring the SSBs, the network device may configure a specific position value of an SSB half-frame in the SSB period, for example, a position value of the first SSB half-frame in the SSB period or a position value of the last SSB half-frame in the SSB period. Then, an offset of each SSB relative to the SSB is further configured. Therefore, the value of the offset may be positive or negative. If the value of the offset is negative, a negative sign may be added to some or all of the foregoing enumerated values. A specific position value of each SSB half-frame in the SSB period or the value of the offset may be determined based on the SSB period. A quantity that is of half-frames for transmitting an SSB and that is configured in one SSB period may be determined based on the SSB period.

For example, if the SSB period is 20 ms, a quantity of half-frames that can be configured for an SSB in the SSB period may be all or some of 1, 2, and 3, and a value that can be configured is some or all of 0, 5, 10, and 15. The value that can be configured is a specific position value of the SSB half-frame in the SSB period or an offset value of the SSB. The unit is ms. If the SSB period is 40 ms, a quantity of half-frames that can be configured for an SSB in the SSB period may be all or some of 1, 2, 3, 4, 5, 6, and 7, and a value that can be configured is some or all of 0, 5, 10, 15, 20, 25, 30, and 35. The value that can be configured is a specific position value of the SSB half-frame in the SSB period or an offset value of the SSB. The unit is ms. If the SSB period is 80 ms, a quantity of half-frames that can be configured for an SSB in the SSB period may be all or some of 1, 2, 3, 4, 5, 6, 7, 8, 9, 10, 11, 12, 13, 14, and 15, and a value that can be configured is some or all of 0, 5, 10, 15, 20, 25, 30, 35, 40, 45, 50, 55, 60, 65, 70, and 75. The value that can be configured is a specific position value of the SSB half-frame in the SSB period or an offset value of the SSB. The unit is ms. If the SSB period is 160 ms, a quantity of half-frames that can be configured for an SSB in the SSB period may be all or some of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, and 31, and a value that can be configured is some or all of 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, and 155. The value that can be configured is a specific position value of the SSB half-frame in the SSB period or an offset value of the SSB. The unit is ms.

In some embodiments, the value that can be configured may be determined based on the quantity of half-frames that can be configured for the SSB in the SSB period. For example, when the quantity of half-frames that can be configured for the SSB in the SSB period is 2, the value that can be configured is any one or more of 0, 5, and 15. The half-frame of the SSB may be replaced with a window of an SSB-based radio resource management measurement timing configuration (SMTC). This mechanism may be applied to a scenario in which frequency division multiplexing is not performed on a paging message or system information and an SSB. Whether the mechanism is supported may be configured by using network configuration, and may be configured in at least one of system information, MAC-CE signaling, RRC signaling, and DCI signaling. In this application, a multiple of a half-frame is used as an offset and a specific position value of an SSB in an SSB period, to align with an existing SSB position, and to prevent a case in which the UE cannot perform synchronization after receiving the SSB.

In conclusion, the SSB may be configured in any one of the foregoing manners, so that requirements of sending different signal blocks in slots including different quantities of symbols can be met.

In some embodiments, that in a plurality of time units, some time units may not be used to transmit a synchronization signal block is further considered. In this case, a time unit index may be configured for the synchronization signal block in addition to the start symbol index. The time unit index is used to represent a time unit that is occupied by the synchronization signal block in a plurality of time units, that is, an index position of a time unit that is used to transmit a synchronization signal block and that is in a plurality of time units.

A time unit in the embodiments of this application is a slot or a subframe. Therefore, the time unit index may include but is not limited to a slot index and/or a frame index.

For ease of understanding, an example in which one slot is used as a time unit is used below for specific description.

In some embodiments, the value of n in the time domain position of the synchronization signal block may be determined based on a time period, and K2 is a length of the time period. In a range of a time period formed by K2 time units, there are K1 time units used to transmit the synchronization signal blocks.

For example, the length of the time period may be five slots, may be 10 slots, or may be 20 slots.

In some embodiments, the length of the time period may be five slots. This may take account of a shorter uplink and downlink period, and a longer time period may take account of an uplink and downlink period with a relatively small subcarrier spacing.

The time period may be set according to a requirement. To better comply with a rule of sending uplink and downlink data, this application provides the following several possible implementations of the time period:

K2 is 5, and K1 is 4;
K2 is 10, and K1 is 8;
K2 is 20, and K1 is 16; or
K2 is 40, and K1 is 32.

In the foregoing several implementations, one or more time units in the K2 time units are reserved and are not used to transmit a synchronization signal block. These time units may be used for uplink and downlink signal transmission or switching, so that impact on the uplink and downlink signal switching or transmission is reduced as much as possible in a normal SSB transmission process.

It should be noted that the foregoing K1 time units are used to transmit SSB data. In this case, it does not mean that each symbol in the K1 time units is used to carry and transmit the SSB data, but means that symbols used to transmit an SSB exist in these time units. In some embodiments, during actual implementation, the time period may be set according to a requirement, and the foregoing several implementations are not intended to limit this application.

In this embodiment of this application, a start slot of a time unit may be the first slot (with a slot index of 0) in the time domain range, or may be another slot, for example, any one or more value values in 1, 2, 3, 4, 5, 6, 7, 8, 9, 10, 11, 12, 13, 14, 15 . . . .

Slot indexes of SSB slots are described below by using an example. The slot indexes may start from 0.

When a slot index is set, a time domain position relationship between SSB slots may be considered. In the slot indexes, two adjacent SSB slots may be consecutive, or there may be at least one other slot (a slot that is not used to carry a synchronization signal block, referred to as a non-SSB slot for short) between two adjacent SSB slots. When SSB slots are consecutive, the SSB slots can be more compact. When the SSB is used for measurement, measurement duration can be reduced, and power consumption can be reduced. On the contrary, when SSB slots are inconsecutive, more slots may be reserved for uplink transmission, and more reserved slots indicate more uplink information that can be transmitted.

In an implementation scenario, slot indexes of SSB slots may be used to indicate that the SSBs are sent in a segment of consecutive slots, and all SSBs are sent in the segment of consecutive slots. In this case, the slot indexes of the SSB slots may be 0, 1, 2, 3, 4, 5, . . . , and P−1. A value of P is determined based on a quantity of candidate SSBs and/or a quantity of SSBs in one slot (a quantity of bearers for an SSB in a time unit). For example, if the quantity of SSBs is 64, 128, or 256, and the quantity of SSBs in one slot is 2, the value of P is 32, 64, or 128 in sequence.

In another implementation scenario, SSB slots are distributed at intervals of one slot. In this case, the slot indexes of the SSB slots may be 0, 2, 4, 6, 8, . . . , and 2P−2. A value of P is determined based on a quantity of candidate SSBs and/or a quantity of SSBs in one slot. For example, if the quantity of SSBs is 64, 128, or 256, and the quantity of SSBs in one slot is 2, the value of P may be 64, 128, or 256 in sequence.

In another implementation scenario, as described above, if K2 is 5 and K1 is 4, in every five slots, four slots are SSB slots, and one slot is not used to send an SSB. In this case, the slot indexes of the SSB slots may be 0, 1, 2, 3, 5, 6, 7, 8, 10, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 38, 78, or 158 in sequence.

In another implementation scenario, if K2 is 5 and K1 is 3, in every five slots, three slots are SSB slots, and two slots are not used to send SSBs. In this case, the slot indexes of the SSB slots may be 0, 1, 2, 5, 6, 7, 10, 11, 12, 15, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 51, 105, or 211 in sequence.

In another implementation scenario, if K2 is 10 and K1 is 8, in every ten slots, eight slots are SSB slots, and two slots are not used to send SSBs. In this case, the slot indexes of the SSB slots may be 0, 1, 2, 3, 4, 5, 6, 7, 10, 11, 12, 13, 14, 15, 16, 17, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 37, 77, or 157 in sequence.

In another implementation scenario, if K2 is 10 and K1 is 6, in every ten slots, six slots are SSB slots, and four slots are not used to send SSBs. In this case, the slot indexes may be: 1, 2, 3, 4, 5, 10, 11, 12, 13, 14, 15, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 51, 103, or 211 in sequence.

In another implementation scenario, if K2 is 10 and K1 is 9, in every ten slots, nine slots are SSB slots, and one slot is not used to send an SSB. In this case, the slot indexes of the SSB slots may be 0, 1, 2, 3, 4, 5, 6, 7, 8, 10, 11, 12, 13, 14, 15, 16, 17, 18, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 34, 70, or 141 in sequence.

In another implementation scenario, if K2 is 20 and K1 is 19, in every twenty slots, nineteen slots are SSB slots, and one slot is not used to send an SSB. In this case, the slot indexes of the SSB slots may be 0, 1, 2, 3, 4, 5, 6, 7, 8, 9, 10, 11, 12, 13, 14, 15, 16, 17, 18, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 70, 134, or 133 in sequence.

In another implementation scenario, if K2 is 20 and K1 is 18, in every twenty slots, eighteen slots are SSB slots, and two slots are not used to send SSBs. In this case, the slot indexes of the SSB slots may be 0, 1, 2, 3, 4, 5, 6, 7, 8, 9, 10, 11, 12, 13, 14, 15, 16, 17, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 733, 66, or 128 in sequence.

In another implementation scenario, if K2 is 20 and K1 is 16, in every twenty slots, sixteen slots are SSB slots, and four slots are not used to send SSBs. In this case, the slot indexes of the SSB slots may be 0, 1, 2, 3, 4, 5, 6, 7, 8, 9, 10, 11, 12, 13, 14, 15, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 35, 75, or 155 in sequence.

In another implementation scenario, if K2 is 20 and K1 is 14, in every twenty slots, fourteen slots are SSB slots, and six slots are not used to send SSBs. In this case, the slot indexes of the SSB slots may be 0, 1, 2, 3, 4, 5, 6, 7, 8, 9, 10, 11, 12, 13, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 43, 87, or 181 in sequence.

In another implementation scenario, if K2 is 20 and K1 is 12, in every twenty slots, twelve slots are SSB slots, and eight slots are not used to send SSBs. In this case, the slot indexes of the SSB slots may be 0, 1, 2, 3, 4, 5, 6, 7, 8, 9, 10, 11, 12, 13, 20, . . . , and P. A value of P is determined based on a quantity of candidate SSBs and/or a quantity of SSBs in one slot. For example, if the quantity of SSBs is 64, 128, or 256, and the quantity of SSBs in one slot is 2, the value of P may be 47, 103, or 207 in sequence.

The foregoing implementations are merely examples. During specific implementation of this solution, the value of P in the slot indexes may be determined based on an actual time domain range. There is no need to reach a maximum value of K2. An approximate value may be taken on the basis of the original maximum value of K2, for example, an integer value between [−2, 2] is added on the basis of the maximum value of K2.

For example, in an implementation scenario, the SSB time period is as follows: In every three slots, there are two SSB slots, and one slot is not used to send an SSB. An index of the SSB slot may be 0, 1, 3, 4, 6, or 7. In this case, P is 7, and this is a configuration manner in a case of a length of nine slots. In some embodiments, SSB transmission has been completed in the slot 6 (which is actually the seventh slot), and the slot 7 may not need to be configured as an SSB slot. In this case, the slot indexes of the SSB slots may be 0, 1, 3, 4, and 6.

For another example, the SSB time period is as follows: In every 20 slots, 14 slots are SSB slots, and six slots are not used to send SSBs. The slot indexes of the SSB slots are 0, 1, 2, 3, 4, 5, 6, 7, 8, 9, 10, 11, 12, 13, 20, . . . , and P. In this case, if the quantity of SSBs is 64, and the quantity of SSBs in one slot is 2, the value of P may be any value in 43, 42, 41, 44, or 45.

In this embodiment of this application, the value of P in the slot indexes may be (NSSB/K1)×K2+NSSB mod K1−1.

NSSB indicates the quantity of SSB slots. K1 and K2 indicate that in every K2 slots, there are K1 SSB slots.

In some embodiments, the SSB slot indexes may be 0 to 63, 0 to 127, 0 to 255, 0 to 31, 0 to 15, 0 to 7, 0 to 21, 0 to 42, or 0 to 85. The latter three value ranges are mainly for a case in which there are three SSBs in one slot, the former three value ranges are mainly for a case in which there is one SSB in one slot, and the middle three value ranges are mainly for a case in which there are two SSBs in one slot. In this case, the SSB slot indexes may be any integer in 0 to 79 except 4, 9, 14, 19, 24, 29, 34, 39, 44, 49, 54, 59, 64, 69, 74 and 79, any integer in 0 to 105 except 3+(0 . . . 20)×5 and 4+(0 . . . 20)×5, any integer in 0 to 79 except 8, 9, 18, 19, 28, 29, 38, 39, 48, 49, 58, 59, 68, 69, 78 and 79, any integer in 0 to 105 except 6+(0 . . . 10)×10, 7+(0 . . . 10)×10, 8+(0 . . . 10)×10, and 9+(0 . . . 10)×10, any integer in 0 to 159 except 4, 9, 14, 19, 24, 29, 34, 39, 44, 49, 54, 59, 64, 69, 74, 79, 84, 89, 94, 99, 104, 109, 114, 119, 124, 129, 134, 139, 144, 149, 154 and 159, any integer in 0 to 211 except 3+(0 . . . 41)×5 and 4+(0 . . . 41)×5, any integer in 0 to 159 except 8, 9, 18, 19, 28, 29, 38, 39, 48, 49, 58, 59, 68, 69, 78, 79, 88, 89, 98, 99, 108, 109, 118, 119, 128, 129, 138, 139, 148, 149, 158 and 159, any integer in 0 to 105 except 6+(0 . . . 10)×10, 7+(0 . . . 10)×10, 8+(0 . . . 10)×10, and 9+(0 . . . 10)×10, or any integer except 0 to 128, 0 to 256, 0 to 32, 0 to 16, 0 to 8, 0 to 22, 0 to 43, or 0 to 85. The latter three value ranges are mainly for a case in which there are three SSBs in one slot, the former three value ranges are mainly for a case in which there is one SSB in one slot, and the middle three value ranges are mainly for a case in which there are two SSBs in one slot.

In conclusion, this embodiment of this application provides the following three implementations (sometimes referred to as, embodiments):

In a first implementation, if the time domain positions are {s1, s2, s3}+n×12, a value range of n may be any one of the following ranges:

all integers in 0 to 43; or some integers in 0 to 54, where the some integers in 0 to 54 include integers in 0 to 54 from which values with single digits being 4 and 9 are removed or integers in 0 to 54 from which values with single digits being 8 or 9 are removed.

For example, the integers in 0 to 54 from which values with single digits being 4 and 9 are removed are all integers in 0 to 54 from which 4, 9, 14, 19, 24, 29, 34, 39, 44, 49, and 54 are removed. A similar description in the following is the same as the principle in this example, and details are not described again.

In some embodiments, it should be noted that, this implementation is applicable to the foregoing scenario in which each time unit has three SSBs, and imposes no limitation on a start symbol index of each SSB in each time unit. Any one of the foregoing configuration manners is used for the start symbol index of the SSB.

In a second implementation, if the time domain positions are {s1, s2}+n×12, a value range of n may be any one of the following ranges:

some integers in 0 to 78, where the some integers in 0 to 78 include integers in 0 to 78 from which values with single digits being 8 and 9 are removed or integers in 0 to 78 from which values with single digits being 5 or 9 are removed;

all integers in 0 to 157; or some integers in 0 to 157, where the some integers in 0 to 157 include integers in 0 to 157 from which values with single digits being 8 and 9 are removed, integers in 0 to 157 from which values with single digits being 4 and 9 are removed, or integers in 0 to 157 from which values 6, 7, 8, and 9 are removed.

It should be noted that, this implementation is applicable to the foregoing scenario in which each time unit has two SSBs, and imposes no limitation on a start symbol index of each SSB in each time unit. Any one of the foregoing configuration manners is used for the start symbol index of the SSB.

In a third implementation, if the time domain positions are {s1, s2, s3, s4}+n×24, a value range of n may be any one of the following ranges:

all integers in 0 to 39;

some integers in 0 to 39, where the some integers in 0 to 39 include integers in 0 to 39 from which values with single digits being 4 and 9 are removed;

all integers in 0 to 79; or some integers in 0 to 79, where the some integers in 0 to 79 include integers in 0 to 79 from which values with single digits being 4 and 9 are removed.

It should be noted that, this implementation is applicable to the foregoing scenario in which each time unit has four SSBs, and imposes no limitation on a start symbol index of each SSB in each time unit. Any one of the foregoing configuration manners is used for the start symbol index of the SSB.

In some embodiments, when the index of the time unit is a frame index, a configuration manner of the frame index is the same as a configuration manner of the slot index, and configuration may be performed according to a requirement. Details are not described again.

It should be noted that, during actual configuration of a time domain position of an SSB, the SSB may be configured by configuring only a start symbol index, the SSB may be configured by configuring a start symbol index and a slot index, the SSB may be configured by configuring a start symbol index and a frame index, or the SSB may be configured by configuring a start symbol index, a slot index, and a frame index.

In the foregoing manner, the time domain position of the synchronization signal block may be determined. In some embodiments, before the sending operation described in S204 is performed, the frequency domain position of the synchronization information block may need to be determined.

In a specific implementation scenario, when the frequency domain position of the SSB is determined, the following operation may be included: determining a type of a signal that can be carried by a resource block (RB) corresponding to each symbol occupied by each synchronization signal block, and determining, based on the type of the signal, a signal carried by each RB.

It should be noted that there may be one or more types of signals that can be carried on a resource block corresponding to any symbol. For example, a resource block corresponding to one symbol may independently carry a PSS, an SSS, or a PBCH. For another example, a resource block corresponding to one symbol may be used to carry a PSS and a PBCH, a resource block corresponding to one symbol may be used to carry an SSS and a PBCH, or a resource block corresponding to one symbol may be used to carry a PSS and an SSS.

For ease of understanding, the following provides Table 1 and Table 2 in this embodiment of this application. Table 1 shows a relationship between each symbol and a type of a signal carried in a resource block corresponding to the symbol when one SSB occupies three symbols. Table 2 shows a relationship between each symbol and a type of a signal carried in a resource block corresponding to the symbol when one SSB occupies two symbols.

TABLE 1

| First symbol | Second symbol | Third symbol |
|---|---|---|
| PSS | SSS | PBCH |
| PSS | PBCH | SSS |
| SSS | PSS | PBCH |
| SSS | PBCH | PSS |
| PBCH | PSS | SSS |
| PBCH | SSS | PSS |
| PSS + PBCH | SSS + PBCH | PBCH |
| SSS + PBCH | PSS + PBCH | PBCH |
| SSS + PBCH | PBCH | PSS + PBCH |
| PSS + PBCH | PBCH | SSS + PBCH |
| PSS | SSS + PBCH | PSS + PBCH |
| SSS + PBCH | PSS | PBCH |
| PSS + PBCH | SSS | PBCH |
| SSS | PSS + PBCH | PBCH |
| PSS | PBCH | SSS + PBCH |
| SSS + PBCH | PBCH | PSS |
| PSS + PBCH | PBCH | SSS |
| PSS + SSS | PBCH | PBCH |
| PSS + SSS + PBCH | PBCH | PBCH |
| SSS | PBCH | PSS + PBCH |

TABLE 2

| First symbol | Second symbol |
|---|---|
| PSS | SSS |
| PSS | PBCH |
| SSS | PSS |
| SSS | PBCH |
| PBCH | PSS |
| PBCH | SSS |
| PSS + PBCH | SSS + PBCH |
| SSS + PBCH | PSS + PBCH |
| SSS + PBCH | PBCH |
| PSS + PBCH | PBCH |
| PSS | SSS + PBCH |
| SSS + PBCH | PSS |
| PSS + PBCH | SSS |
| SSS | PSS + PBCH |
| PSS | PBCH + SSS |
| PSS + SSS | PBCH |
| PSS + SSS + PBCH | PBCH |

During specific implementation, one of the configuration solutions shown in Table 1 or Table 2 may be selected based on a quantity of symbols occupied by an SSB, for determining. "+" in Table 1 and Table 2 indicates that a resource block corresponding to the symbol simultaneously carries two types of signals.

Based on the determined signal type corresponding to each symbol, a resource block allocation scheme corresponding to each symbol may need to be determined. It can be learned that when any symbol is used to carry one type of signal, all or some resource blocks corresponding to the symbol may be used to carry the signal. When some resource blocks are used to carry the signal, the other signals are empty and may not be used to carry data, or carried data is empty.

For ease of description, in this application, a resource block used to transmit each signal is first defined as follows: A resource block carrying the PSS is defined as a first resource block, a resource block carrying the PBCH is defined as a second resource block, and a resource block carrying the SSS is defined as a third resource block. In addition, a schematic diagram of a resource block corresponding to each symbol is described in this application. In this application, frequencies of resource blocks in a plurality of resource blocks corresponding to each symbol are in descending order from top to bottom. That is, a frequency of a resource block located in an upper part of the schematic diagram is higher than a frequency of a resource block located in a lower part of the schematic diagram. This manner is used for description in this application, and details are not described again.

Based on the foregoing definition, there may be a plurality of configuration manners.

In a possible implementation, when signals corresponding to any symbol include a PSS and an SSS, a plurality of resource blocks corresponding to the symbol include first resource blocks and third resource blocks. In this case, frequency domain positions of the first resource blocks and the third resource blocks are not particularly limited in this embodiment of this application. Frequencies of the first resource blocks are higher than frequencies of the third resource blocks. In this case, in this application, the first resource blocks are located above the third resource blocks. In some embodiments, frequencies of the first resource blocks are lower than frequencies of the third resource blocks. In other words, in the schematic diagram of this application, the first resource blocks are located below the third resource blocks. In some embodiments, the first resource blocks are located at two ends of the third resource blocks. That the first resource blocks are located at two ends of the third resource blocks means that some first resource blocks are located at one end of the third resource blocks, and the other first resource blocks are located at the other end of the third resource blocks. That is, frequencies of some first resource blocks are higher than frequencies of the third resource blocks, and frequencies of some other first resource blocks are lower than the frequencies of the third resource blocks.

Figure 6:
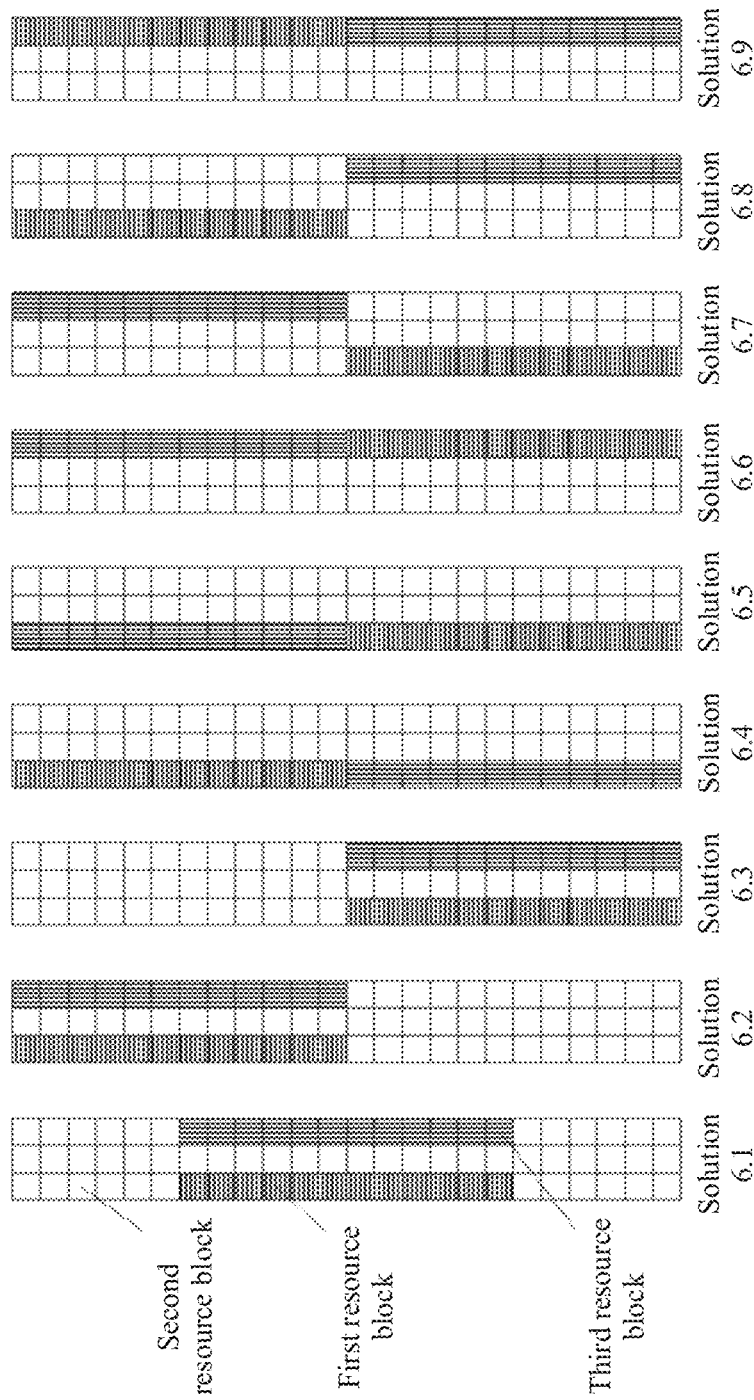
FIG. 6 is a schematic diagram of nine frequency domain resource allocation solutions, according to some embodiments.
Figure 7:
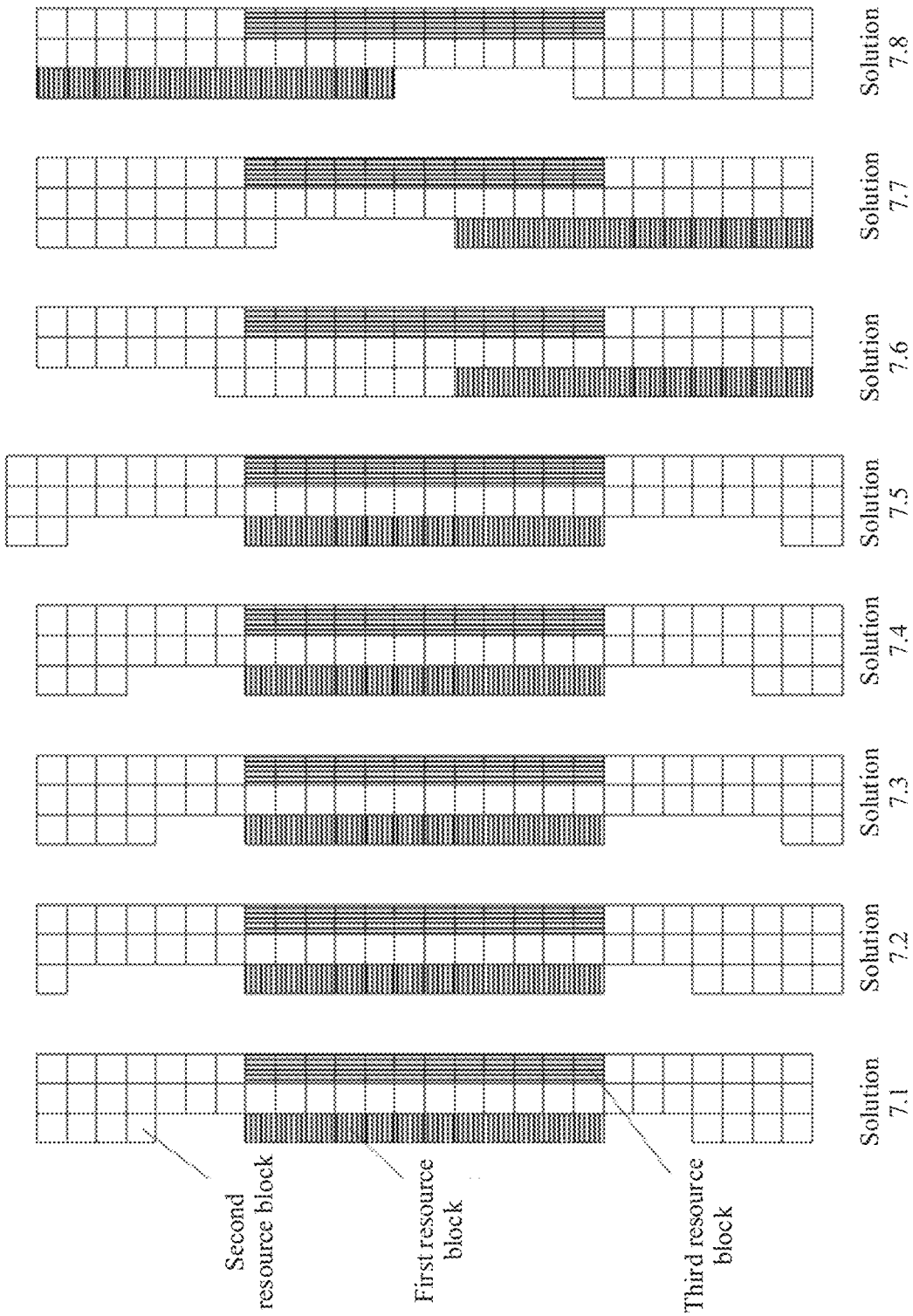
FIG. 7 is a schematic diagram of other eight frequency domain resource allocation solutions, according to some embodiments.
Figure 8:
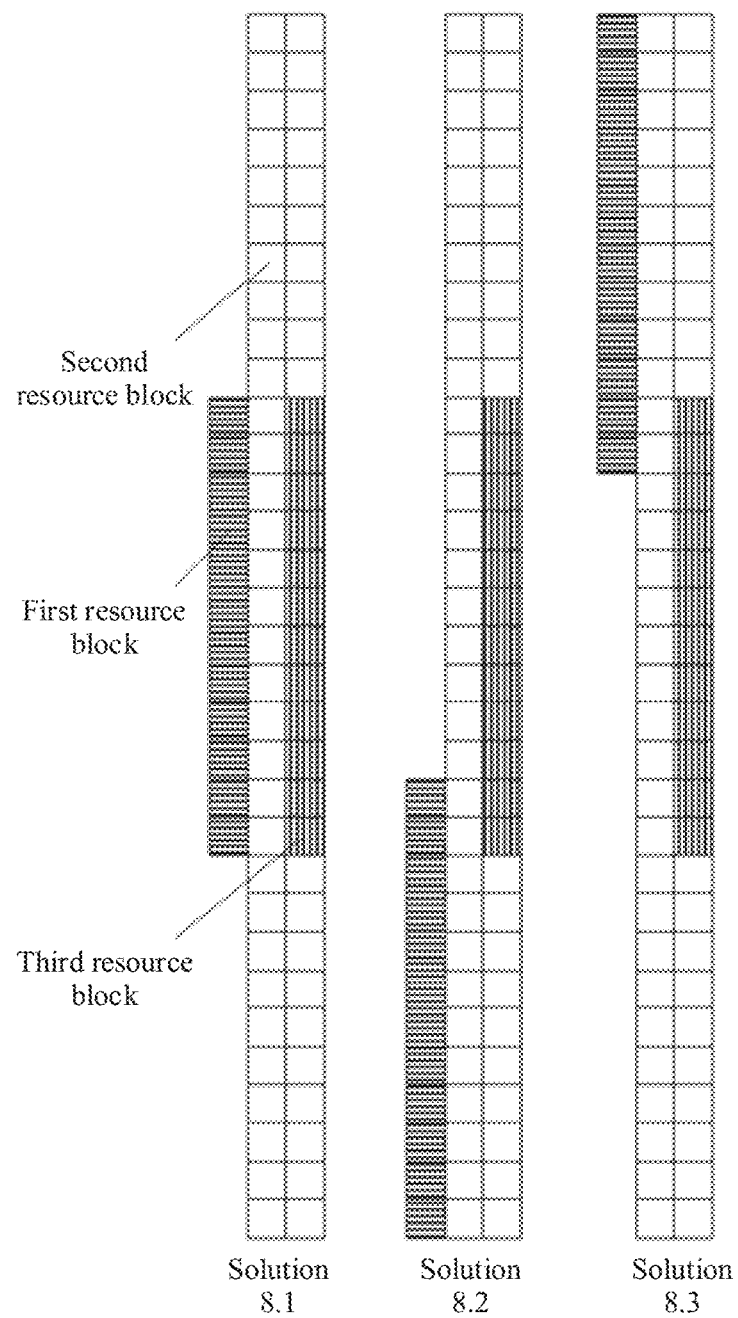
FIG. 8 is a schematic diagram of another three frequency domain resource allocation solutions, according to some embodiments.

For ease of understanding, the embodiments of this application provide schematic diagrams of frequency domain resource allocation shown in FIG. 6 to FIG. 8.

FIG. 6 is a schematic diagram of nine frequency domain resources allocation solutions, according to some embodiments. For example, FIG. 6 shows a total of nine frequency domain resource allocation solutions: 6.1 to 6.9. In FIG. 6, an SSB occupies 24 resource blocks in total, and a PSS and an SSS each occupy 12 resource blocks corresponding to symbols in which the PSS and the SSS are located. All resource blocks except those used for the PSS and the SSS are used to carry a PBCH.

For details, refer to the solution 6.1 in FIG. 6. In the solution 6.1, a synchronization signal block occupies three symbols in total.

Resource blocks corresponding to the first symbol are used to carry a primary synchronization signal PSS and a physical broadcast channel PBCH, and resource blocks (the second resource blocks) carrying the PBCH are located at two ends of the resource blocks (the first resource blocks) carrying the PSS.

Resource blocks corresponding to the second symbol are used to carry the PBCH.

Resource blocks corresponding to the third symbol are used to carry a secondary synchronization signal SSS and the PBCH, and resource blocks carrying the PBCH are located at two ends of resource blocks (the third resource blocks) carrying the SSS.

In an implementation shown in FIG. 6, the first resource blocks and the third resource blocks each are located in the middle of the 24 resource blocks to which the first resource blocks and the third resource blocks belong, and positions of the first resource blocks and positions of the third resource blocks are the same.

During actual implementation, refer to the solutions 6.1 to 6.9 in FIG. 6. The PSS is used as an example. In 24 resource blocks corresponding to symbols in which the PSS is located, twelve resource blocks (the first resource blocks) occupied by the PSS may be located in the middle (for example, the solution 6.1), may be located in the upper part (for example, the solutions 6.2, 6.4, 6.8, and 6.9), or may be located in the lower part (for example, the solutions 6.3, 6.5, 6.6, and 6.7). An SSS configuration solution is similar to the PSS configuration solution, and is not described again.

In some embodiments, relative positions of 12 resource blocks (the first resource blocks and the third resource blocks) corresponding to each of the PSS and the SSS in symbols in which the PSS and the SSS are located are not specifically limited. In the solutions 6.1 to 6.3, the PSS and the SSS are located on two different symbols, and positions of resource blocks occupied by the PSS and the SSS in all resource blocks corresponding to the symbols are the same. However, in the solutions 6.4 to 6.6 and 6.9, the PSS and the SSS are located in a same symbol, and positions of resource blocks occupied by the PSS and the SSS in all resource blocks corresponding to the symbol are corresponding. In the solutions 6.7 and 6.8, the PSS and the SSS are located on two different symbols, and positions of resource blocks occupied by the PSS and the SSS in all resource blocks corresponding to the symbols are corresponding.

FIG. 7 is a schematic diagram of other eight frequency domain resources allocation solutions, according to some embodiments. For example, FIG. 7 shows a total of eight frequency domain resource allocation solutions: 7.1 to 7.8. In FIG. 7, other than the second symbol that is used to carry a PBCH, resource blocks corresponding to one symbol are used to carry the PBCH and a PSS, and resource blocks corresponding to the other symbol are used to carry the PBCH and an SSS. In FIG. 7, an SSB occupies 26 resource blocks, 27 resource blocks, or 28 resource blocks. In some embodiments. in addition to the resource blocks occupied by the PSS, the SSS, and the PBCH, there is a blank part. This part of resource blocks may be considered not to be used to carry data.

The PSS is still used as an example. Resource blocks occupied by the PSS in a symbol in which the PSS is located may be 12 resource blocks in the middle (for example, a center), and 7 resource blocks in each of the upper part and the lower part are used for data transmission and/or are not used for data transmission. In some embodiments, resource blocks occupied by the PSS in a symbol in which the PSS is located may be 12 resource blocks in the middle, and 6, 7 or 8 resource blocks in an upper part or 7, 6 or 8 resource blocks in a lower part are used for data transmission and/or are not used for data transmission. In some embodiments, resource blocks occupied by the PSS in a symbol in which the PSS is located may be 12 resource blocks at the bottom or 12 resource blocks at the top, and 3, 4, 6, 7, or 8 resource blocks above the resource blocks for the PSS and 3, 4, 6, 7, or 8 resource blocks below the resource blocks for the PSS may not be used for data transmission. An SSS configuration solution is similar to the PSS configuration solution, and is not described again.

FIG. 8 is a schematic diagram of another three frequency domain resource allocation solutions, according to some embodiments. For example, FIG. 8 shows a total of three frequency domain resource allocation solutions: 8.1 to 8.3. In FIG. 8, an SSB occupies 32 resource blocks. In some embodiments, in addition to resource blocks occupied by a PSS, an SSS, and a PBCH, there is a part of blank resource blocks. This part of resource blocks may be considered not to be used to carry data.

Resource blocks occupied by the PSS in the symbol in which the PSS is located may be 12 resource blocks in the middle, and there are 10 resource blocks in each of the upper part and the lower part. None of the 10 resource blocks is used for data transmission. In some embodiments, there may be 12 resource blocks in the upper part, and none of the resource blocks below the 12 resource blocks is used for data transmission. In some embodiments, there may be 12 resource blocks in the lower part, and none of the resource blocks above the 12 resource blocks is used for data transmission, as shown in FIG. 8. Resource blocks occupied by the SSS in the symbol in which the SSS is located may be 12 resource blocks in the middle, and there are 10 resource blocks in each of the upper part and the lower part. In some embodiments, resource blocks occupied by the SSS in the symbol in which the SSS is located may be 12 resource blocks in the upper part, or 12 resource blocks in the lower part.

In the foregoing manner, the time domain position and the frequency domain position of the synchronization signal block may be determined, to perform the sending operation in S204.

Correspondingly, this application further provides a synchronization signal transmission method performed on a terminal side.

Figure 9:
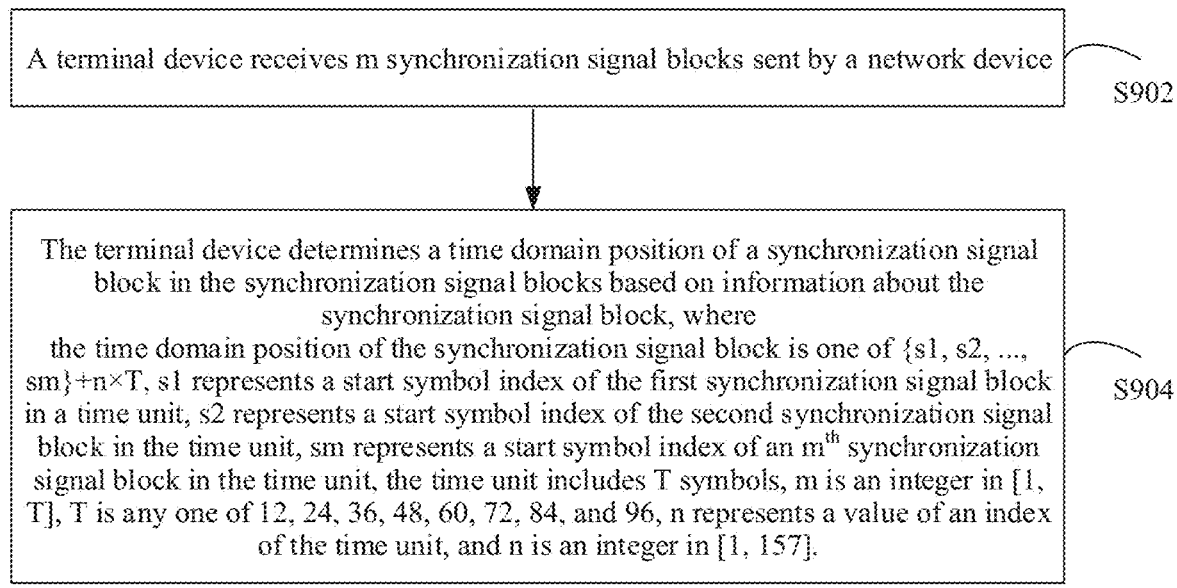
FIG. 9 is a schematic flowchart of another synchronization signal transmission method according to some embodiments.

FIG. 9 is a schematic flowchart of another synchronization signal transmission method according to some embodiments. As shown in FIG. 9, the method includes the following operations.

S902. A terminal device receives m synchronization signal blocks sent by a network device.

S904. The terminal device determines a time domain position of a synchronization signal block in the synchronization signal blocks based on information about the synchronization signal block, where the time domain position of the synchronization signal block is one of {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157].

It should be noted that there may be a plurality of synchronization signal blocks received on the terminal device side. In this case, a time domain position of each synchronization signal block is one of {s1, s2, . . . , sm}+n×T. In some embodiments, a definition of the time domain position of the synchronization signal block in the synchronization signal transmission method performed on the terminal device side is the same as the foregoing definition on the network device side. Details are not described herein again.

In some embodiments, each of the synchronization signal blocks sent by the network device side to the terminal device carries first information, and the first information is used to indicate a time domain position index of each synchronization signal block.

The first information may be one or more demodulation reference signals DMRSs, and the DMRS may be a DMRS of a PBCH.

In this application, the first information may be used to indicate a time domain position index of a synchronization signal block, and during specific implementation, may be indicated by using an x-bit sequence, where x is an integer greater than 0. In a possible implementation scenario, a value of x may include but is not limited to 4, 5, or 6.

For example, the time domain position of the SSB is indicated by using a 4-bit sequence. For example, 16 sequences may be used to indicate information of most significant four bits or information of least significant four bits of an SSB index. In some embodiments, 32 sequences may be used to indicate information of most significant five bits or information of least significant five bits of an SSB index. In some embodiments, 64 sequences may be used to indicate information of most significant six bits or information of least significant six bits of an SSB index.

In some embodiments, the sequence in this embodiment of this application may include but is not limited to the following several types of sequences: a longest linear feedback shift register m-sequence, a constant amplitude zero auto-correlation ZC sequence, a pseudo-random Gold sequence, or a Boltzmann discrete linear algebraic code Golden sequence.

An m sequence is short for a longest linear feedback shift register sequence, and is a pseudo-random sequence, a pseudo-noise (PN) code, or a pseudo-random code. Currently, the m-sequence is a most basic pseudo-noise (PN) sequence used in a code division multiple access (CDMA) system.

A Zadoff-chu (ZC) sequence is a type of constant amplitude zero auto-correlation (CAZAC) sequence, and has characteristics of constant envelope, zero autocorrelation, and good cross-correlation. After Fourier transform, the ZC sequence is still a ZC sequence.

A Gold sequence is a pseudo-random sequence with relatively good characteristics, includes two m-sequences with a same code length and a same code clock rate. The two m-sequences can be combined by modulo 2. The Gold sequence has good self-correlation and cross-correlation characteristics and is used to generate (e.g., determine, calculate) many sequences.

The Golden sequence is a Boltzmann discrete linear algebraic code, has randomness and orthogonality, and is used to generate pilot sequences in a communications system, to implement channel estimation based on an interpolation model.

When the DMRS sequence is a gold sequence or a golden sequence, the sequence may be initialized by using the following formula:

$$c_{init} = 2^{y1}(i_{SSB}+1)\left(\left\lfloor \frac{N}{f1} \right\rfloor + 1\right) + 2^{y2}(i_{SSB}+1) + (N \bmod f2)$$

where y1 may be 10, 11, 12, 13, 14, 15, or 16, y2 may be 6, 5, 4, 7, 8, or 9, a value of f1 or f2 may be any one of 2, 3, 4, 5, and 6, N is a cell ID, $i_{SSB}$ is an index of the SSB, $\lfloor \ \rfloor$ represents rounding down, mod indicates a modulo operation, and all or some of the three "+1" in the foregoing formula may be removed.

In this implementation scenario, when performing operation S904, the terminal device may determine, based on first information carried in any synchronization signal block, a time domain position of the synchronization signal block that carries the first information. In other words, the network device directly indicates, a time domain position of each synchronization signal block in the synchronization signal block by using first information. In this way, the terminal device can conveniently determine the time domain position of the synchronization signal block. This implementation is simple and easy to implement, and is easy to extend.

In some embodiments, if the first information is not carried in the synchronization signal block, the first information may be transmitted in a manner in which the network device separately sends the first information and the terminal device separately receives the first information. In this implementation scenario, a sending order of the first information and the synchronization signal block is not particularly limited in this application.

In some embodiments, the network device may notify the terminal device of synchronization signal block information that has been sent by the network device. In some embodiments, the synchronization signal block information may be synchronization signal block quantity information.

In this case, the method may include:

The network device sends second information, where the second information is used to indicate information about the sent synchronization signal blocks.

The second information is beam group information.

In this case, the beam group information may be represented by using fields whose lengths are N bits and M bits respectively, where the field with the N bits represents sent synchronization signal block groups, and the field with the M bits is synchronization signal blocks in each sent synchronization signal block group.

In some embodiments, in the E band field, a quantity of SSB beams is very large, and there may be 128 SSBs, 256 SSBs, or 121 SSBs. In this case, the SSBs may be indicated in a group manner. Group indication information may be represented in a form of "a quantity of groups multiplied by a quantity of SSBs in each group". In this case, a time domain range indicated by the "group" may include but is not limited to a subframe or a slot.

In some embodiments, the beam group indication information in this application may be as follows:

N is 16 and M is 16 (in this case, the second information occupies a field of 16×16 bits in total);

N is 16 and M is 8 (in this case, the second information occupies a field of 16×8 bits in total);

N is 8 and M is 16 (in this case, the second information occupies a field of 8×16 bits in total); or N is 11 and M is 11 (in this case, the second information occupies a field of 11×11 bits in total).

For example, the 128 SSBs may be represented by using a field of 8×16 bits. In this case, an 8-bit field is information about a sent synchronization signal block group, and a 16-bit field is information about a synchronization signal block in each sent synchronization signal block group.

Correspondingly, in this case, the terminal device side may perform the following method:

The terminal device receives the second information.

After receiving the second information, the terminal device may determine whether all the synchronization signal blocks sent by the network device are received. If some synchronization signal blocks are not received, the terminal device may determine, based on the foregoing determined time domain positions, a synchronization signal block that is not received.

It may be understood that some or all of the operations or operations in the foregoing embodiments are merely examples. In this embodiment of this application, other operations or variations of various operations may be further performed. In some embodiments, the operations may be performed in different sequences presented in the foregoing embodiment, and not all operations in the foregoing embodiment need to be performed.

Figure 10:
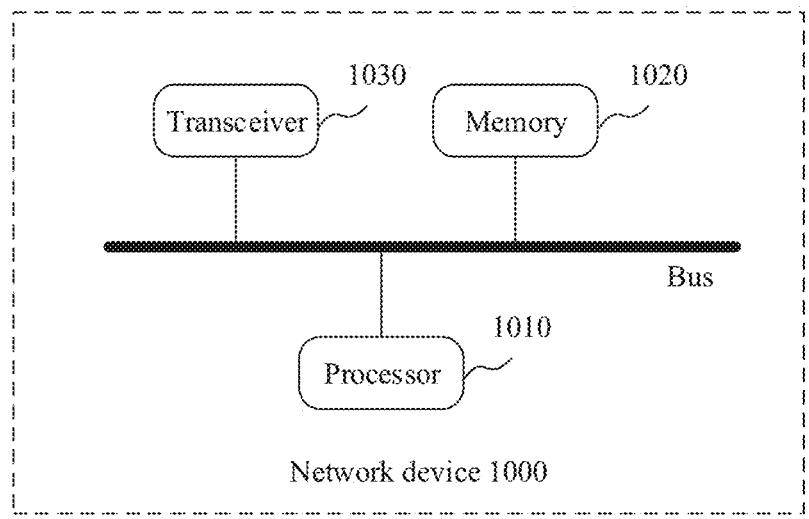
FIG. 10 is a schematic structural diagram of a network device, according to some embodiments.

FIG. 10 is a schematic structural diagram of a network device, according to some embodiments. As shown in FIG. 10, the network device 1000 may include a processor 1010, a memory 1020, and a transceiver 1030. The processor 1010 is configured to control the transceiver 1030 to receive and send signals, and the memory 1020 is configured to store computer programs or instructions. The processor 1010 is configured to invoke the computer programs or the instructions from the memory 1020, and run the computer programs or the instructions, to perform the synchronization signal transmission method performed on the network device side in this application and a corresponding procedure and/or operation performed by the network device in the embodiments of this application. For brevity, details are not described herein again.

The processor 1010 may also be referred to as a processing unit, and may implement a specific control function. There may be one or more processors. The processor 1010 may be a general-purpose processor, a dedicated processor, or the like.

In some embodiments, the processor 1010 may store instructions. The instructions may be run by the processor 1010, so that the network device 1000 performs the method corresponding to the network device described in the method embodiments.

In some embodiments, the network device 1000 may include a circuit. The circuit may implement a sending, receiving, or communication function in the foregoing method embodiments.

In some embodiments, there may be one or more memories 1020 in the network device 1000. The memory 1020 stores computer programs or instructions, and the computer programs or the instructions may be run on the processor 1010, so that the network device 1000 performs the method described in the foregoing method embodiments. In some embodiments, the memory 1020 may store other related data. In some embodiments, the processor 1010 may store instructions and/or data.

The processor 1010 and the memory 1020 may be separately disposed, or may be integrated together.

In this application, the transceiver 1030 in the network device 1000 is configured to send data, and is configured to receive data.

The processor 1010 may be referred to as a processing unit. The transceiver 1030 may be referred to as a transceiver unit, a transceiver machine, a transceiver circuit, or the like, and is configured to implement transceiver functions of the network device. A transceiver is used as an example. The transceiver may include a receiver and a transmitter, or a receiver and a transmitter may be integrated (e.g., joined, combined, grouped) as a transceiver.

If the network device 1000 is configured to implement an operation of the network device in the embodiment corresponding to FIG. 2, for example, the transceiver 1030 may send a synchronization signal block in a determined time domain position. The transceiver 1030 may complete another corresponding communication function. The processor 1010 is configured to complete a corresponding determining or control operation, and/or may store corresponding instructions in the memory. For a specific processing manner of each component, refer to related descriptions in the foregoing embodiments.

As shown in FIG. 10, in the network device 1000, the processor 1010, the memory 1020, and the transceiver 1030 are connected by using a bus.

In addition, this application further provides a communications apparatus. The communications apparatus has a function of the network device in any possible implementation of the method performed by the network device. The functions may be implemented by hardware, or may be implemented by hardware executing corresponding software. The hardware or the software includes one or more units corresponding to the functions.

Figure 11:
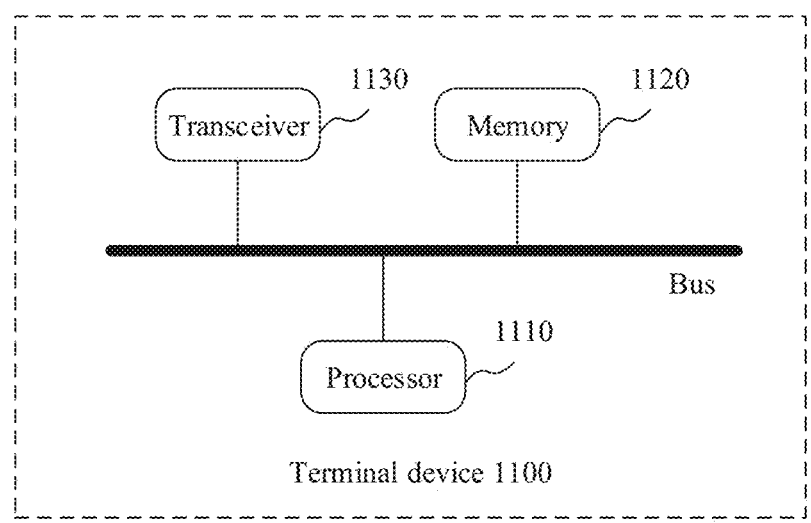
FIG. 11 is a schematic structural diagram of a terminal device, according to some embodiments.

FIG. 11 is a schematic structural diagram of a terminal device, according to some embodiments. As shown in FIG. 11, the terminal device 1100 includes a processor 1110, a memory 1120, and a transceiver 1130. The processor 1110 is configured to control the transceiver 1130 to receive and send signals, and the memory 1120 is configured to store computer programs or instructions. The processor 1110 is configured to invoke the computer programs or the instructions from the memory 1120, and run the computer programs or the instructions, to perform the synchronization signal transmission method performed on the terminal device side in this application and a corresponding procedure and/or operation performed by the terminal device in the embodiments of this application. For brevity, details are not described herein again.

The processor 1110 may also be referred to as a processing unit, and may implement a specific control function. There may be one or more processors. The processor 1110 may be a general purpose processor, a dedicated processor, or the like.

In some embodiments, the processor 1110 may store instructions. The instructions may be run by the processor 1110, so that the terminal device 1100 performs the method corresponding to the terminal device described in the method embodiments.

In some embodiments, the terminal device 1100 may include a circuit. The circuit may implement a sending, receiving, or communication function in the foregoing method embodiments.

In some embodiments, there may be one or more memories 1120 in the terminal device 1100. The memory 1120 stores computer programs or instructions, and the computer programs or the instructions may be run on the processor 1110, so that the terminal device 1100 performs the method described in the foregoing method embodiments. In some embodiments, the memory 1120 may store other related data. In some embodiments, the processor 1110 may store instructions and/or data.

The processor 1110 and the memory 1120 may be separately disposed, or may be integrated together.

In this application, the transceiver 1130 in the terminal device 1100 is configured to send data, and is configured to receive data.

The processor 1110 may be referred to as a processing unit. The transceiver 1130 may be referred to as a transceiver unit, a transceiver machine, a transceiver circuit, a transceiver, or the like, and is configured to implement transceiver functions of the communications apparatus. A transceiver is used as an example. The transceiver may include a receiver and a transmitter, or a receiver and a transmitter may be integrated as a transceiver.

If the terminal device 1100 is configured to implement an operation of the terminal device in the embodiment corresponding to FIG. 9, for example, the transceiver 1130 may send a synchronization signal block in a determined time domain position. The transceiver 1130 may complete another corresponding communication function. The processor 1110 is configured to complete a corresponding determining or control operation, and/or may store corresponding instructions in the memory. For a specific processing manner of each component, refer to related descriptions in the foregoing embodiments.

As shown in FIG. 11, in the terminal device 1100, the processor 1110, the memory 1120, and the transceiver 1130 are connected by using a bus.

In addition, this application further provides another communications apparatus. The communications apparatus has a function of the terminal device in any possible implementation of the method performed by the terminal device. The functions may be implemented by hardware, or may be implemented by hardware executing corresponding software. The hardware or the software includes one or more units corresponding to the functions.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and/or the transceiver may be manufactured by using various 1C technologies, for example, a complementary metal oxide semiconductor (CMOS), an N-channel metal-oxide-semiconductor (NMOS), a P-channel metal-oxide-semiconductor (PMOS), a bipolar junction transistor (BJT), a bipolar CMOS (BiCMOS), silicon germanium (SiGe), and gallium arsenide (GaAs).

In some embodiments, the network device 1000 or the terminal device 1100 may be an independent device or may be a part of a relatively large device. For example, the network device 1000 or the terminal device 1100 may be:

(1) an independent integrated circuit IC, a chip, a chip system, or a subsystem;
(2) a set having one or more ICs. In some embodiments, the IC set may include a storage component configured to store data and/or an instruction;
(3) an ASIC, for example, a modem (MSM);
(4) a module that can be embedded in another device;
(5) a receiver, a terminal, a cellular phone, a wireless device, a handheld phone, a mobile unit, a network device, or the like; or
(6) other devices.

Figure 12:
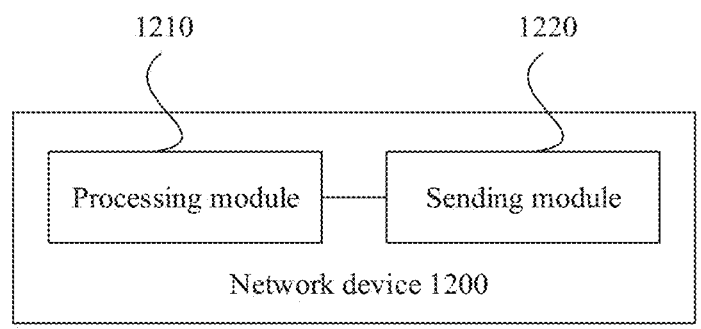
FIG. 12 is a schematic structural diagram of another network device, according to some embodiments.

In addition, FIG. 12 is a schematic structural diagram of another network device, according to some embodiments. As shown in FIG. 12, the network device 1200 includes a processing module 1210 and a sending module 1220. The processing module 1210 is configured to determine time domain positions for sending m synchronization signal blocks, where the time domain positions of the synchronization signal blocks are one or more positions in {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157]. The sending module 1220 is configured to send the synchronization signal blocks to a terminal device in the time domain positions of the synchronization signal blocks.

In some embodiments, if T is 12, m is an integer in [1, 8], and a value of any start symbol index in s1, s2, . . . , and sm is any value in [1, 9];

if T is 24, m is an integer in [1, 8], and a value of any start symbol index in s1, s2, . . . , and sm is any value in [1, 22];

if T is 48, m is an integer in [1, 16], and a value of any start symbol index in s1, s2, . . . , and sm is any value in [1, 44]; or if T is 96, m is an integer in [1, 32], and a value of any start symbol index in s1, s2, . . . , and sm is any value in [1, 90].

In some embodiments, the time domain positions are {s1, s2, s3}+n×12; and s1 is 2, s2 is 5, and s3 is 8; or s1 is 3, s2 is 6, and s3 is 9.

In this case, a value of n is as follows:
any integer in 0 to 43;
any integer in 0 to 54 except values with single digits being 4 and 9; or any integer in 0 to 54 except values with single digits being 8 and 9.

In some embodiments, the time domain positions are {s1, s2}+n×12; and a value of s1 is one of 2, 3, 4, 5, and 6, a value of s2 is one of 5, 6, 7, and 8, and a difference between the value of s2 and the value of s1 is greater than or equal to a quantity of symbols occupied by the synchronization signal block.

In this case, a value of n is as follows:
any integer in 0 to 78 except values with single digits being 8 and 9;
any integer in 0 to 78 except values with single digits being 5 and 9;
any integer in 0 to 157;
any integer in 0 to 157 except values with single digits being 8 and 9;
any integer in 0 to 157 except values with single digits being 4 and 9; or any integer in 0 to 157 except values with single digits being 6, 7, 8, and 9.

In some embodiments, the time domain positions are {s1, s2, s3, s4}+n×24; and s1 is 2, s2 is 6, s3 is 14, and s4 is 18; s1 is 1, s2 is 5, s3 is 13, and s4 is 17; or s1 is 3, s2 is 7, s3 is 15, and s4 is 19.

In this case, a value of n is as follows:
any integer in 0 to 39;
any integer in 0 to 39 except values with single digits being 4 and 9;
any integer in 0 to 79; or any integer in 0 to 79 except values with single digits being 4 and 9.

In some embodiments, each synchronization signal block in the synchronization signal blocks carries first information, and the first information is used to indicate a time domain position index of the synchronization signal block.

The first information is one or more demodulation reference signals DMRSs.

In some embodiments, the first information may be represented by using an x-bit sequence, where x is an integer greater than 0. During specific implementation, a value of x may include but is not limited to 4, 5, or 6.

The sequence in this application is any one of the following: a longest linear feedback shift register m-sequence, a constant amplitude zero auto-correlation ZC sequence, a pseudo-random Gold sequence, or a Boltzmann discrete linear algebraic code Golden sequence.

In some embodiments, the sending module 1220 is configured to:
send second information, where the second information is used to indicate information about the sent synchronization signal blocks.

In some embodiments, the second information is beam group information. The beam group information is represented by using fields whose lengths are N bits and M bits respectively, where the field with the N bits represent sent synchronization signal block groups, and the field with the M bits are synchronization signal blocks in each sent synchronization signal block group.

During specific implementation, the beam group information may be:
N is 16 and M is 16;
N is 16 and M is 8;
N is 8 and M is 16; or
N is 11 and M is 11.

In some embodiments, the synchronization signal block occupies three symbols.

Resource blocks corresponding to the first symbol are used to carry a primary synchronization signal PSS and a physical broadcast channel PBCH, and resource blocks carrying the PBCH are located at two ends of resource blocks carrying the PSS.

Resource blocks corresponding to the second symbol are used to carry the PBCH.

Resource blocks corresponding to the third symbol are used to carry a secondary synchronization signal SSS and the PBCH, and resource blocks carrying the PBCH are located at two ends of resource blocks carrying the SSS.

The network device in the embodiment shown in FIG. 12 may be configured to execute the technical solutions in the foregoing method embodiments. For an implementation principle and a technical effect of the network device, further refer to related descriptions in the method embodiments. In some embodiments, the network device may be a base station, or may be a component (for example, a chip or a circuit) of a base station.

It should be understood that division into the foregoing modules of the network device shown in FIG. 12 is merely logical function division. During actual implementation, all or some of the modules may be integrated into one physical entity, or may be physically separated. In some embodiments, all of the modules may be implemented in a form of software invoked by a processing element or in a form of hardware. In some embodiments, some of the modules may be implemented in a form of software invoked by a processing element, and some of the modules may be implemented in a form of hardware. The processing module may be an independently disposed processing element, or may be integrated into the network device, for example, a chip of the network device for implementation. In some embodiments, the processing module may be stored in a memory of the network device in a form of a program to be invoked by a processing element of the network device to perform a function of each of the foregoing modules. The sending module is configured to support the network device in performing the sending operations of the network device in the embodiments, and may be a transmitter, a transceiver, an output interface, or an output circuit. In some embodiments, the network device may include a receiving module. The receiving module is configured to support the network device in performing the operation of receiving information by the network device in the embodiments. The receiving module may be a receiver or a transceiver, an input interface, or an input circuit. In some embodiments, all or some of the modules may be integrated together, or may be implemented independently. The processing element described herein may be an integrated circuit with a signal processing capability. In an implementation process, operations in the foregoing methods or the foregoing modules can be implemented by using a hardware integrated logical circuit in the processor element, or by using instructions in a form of software.

For example, the foregoing modules may be configured as one or more integrated circuits implementing the foregoing method, for example, one or more application-specific integrated circuits (ASIC), one or more microprocessors (DSP), or one or more field programmable gate arrays (FPGA). For another example, when one of the foregoing modules is implemented in a form of scheduling a program by a processing element, the processing element may be a general purpose processor, for example, a central processing unit (CPU) or another processor that can invoke the program. For still another example, the modules may be integrated together and implemented in a form of a system-on-a-chip (SOC).

Figure 13:
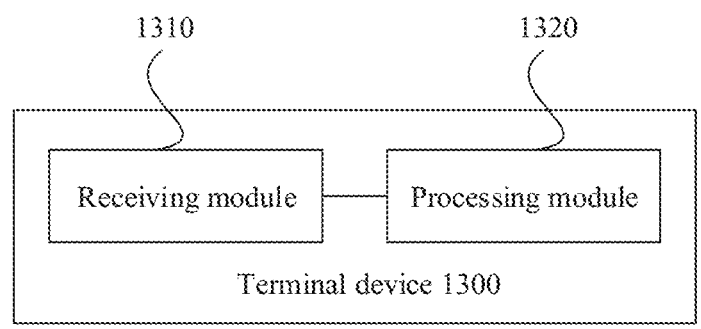
FIG. 13 is a schematic structural diagram of another terminal device, according to some embodiments.

In addition, FIG. 13 is a schematic structural diagram of another terminal device, according to some embodiments. As shown in FIG. 13, the terminal device 1300 includes a receiving module 1310 and a processing module 1320. The receiving module 1310 is configured to receive m synchronization signal blocks sent by a network device. The processing module 1320 is configured to determine a time domain position of a synchronization signal block in the synchronization signal blocks based on information about the synchronization signal block. The time domain position of the synchronization signal block is one of {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit includes T symbols, m is an integer in [1, T], T is any one of 12, 24, 36, 48, 60, 72, 84, and 96, n represents an index of the time unit, and a value of n is an integer in [0, 157].

In some embodiments,
if T is 12, m is an integer in [1, 8], and a value of any start symbol index in s1, s2, . . . , and sm is any value in [1, 9];
if T is 24, m is an integer in [1, 8], and a value of any start symbol index in s1, s2, . . . , and sm is any value in [1, 22];
if T is 48, m is an integer in [1, 16], and a value of any start symbol index in s1, s2, . . . , and sm is any value in [1, 44]; or
if T is 96, m is an integer in [1, 32], and a value of any start symbol index in s1, s2, . . . , and sm is any value in [1, 90].

In some embodiments, the time domain positions are {s1, s2, s3}+n×12; and s1 is 2, s2 is 5, and s3 is 8; or s1 is 3, s2 is 6, and s3 is 9.

In this case, a value of n is as follows:
any integer in 0 to 43;
any integer in 0 to 54 except values with single digits being 4 and 9; or any integer in 0 to 54 except values with single digits being 8 and 9.

In some embodiments, the time domain positions are {s1, s2}+n×12; and a value of s1 is one of 2, 3, 4, 5, and 6, a value of s2 is one of 5, 6, 7, and 8, and a difference between the value of s2 and the value of s1 is greater than or equal to a quantity of symbols occupied by the synchronization signal block.

In this case, a value of n is as follows:
any integer in 0 to 78 except values with single digits being 8 and 9;
any integer in 0 to 78 except values with single digits being 5 and 9;
any integer in 0 to 157;
any integer in 0 to 157 except values with single digits being 8 and 9;
any integer in 0 to 157 except values with single digits being 4 and 9; or any integer in 0 to 157 except values with single digits being 6, 7, 8, and 9.

In some embodiments, the time domain positions are {s1, s2, s3, s4}+n×24; and
s1 is 2, s2 is 6, s3 is 14, and s4 is 18; s1 is 1, s2 is 5, s3 is 13, and s4 is 17; or s1 is 3, s2 is 7, s3 is 15, and s4 is 19.

In this case, a value of n is as follows:
any integer in 0 to 39;
any integer in 0 to 39 except values with single digits being 4 and 9;
any integer in 0 to 79; or any integer in 0 to 79 except values with single digits being 4 and 9.

In some embodiments, each synchronization signal block in the synchronization signal blocks carries first information, and the first information is used to indicate a time domain position index of the synchronization signal block. In this case, that the processing module is configured to determine a time domain position of a synchronization signal block may be implemented in the following manner: determining, based on the first information and the information about the synchronization signal block, the time domain position of the synchronization signal block that carries the first information.

In some embodiments, the first information is one or more demodulation reference signals DMRSs.

In some embodiments, the first information is represented by using an x-bit sequence, where x is an integer greater than 0. During specific implementation, a value of x may include but is not limited to 4, 5, or 6.

The sequence in this application is any one of the following: a longest linear feedback shift register m-sequence, a constant amplitude zero auto-correlation ZC sequence, a pseudo-random Gold sequence, or a Boltzmann discrete linear algebraic code Golden sequence.

In some embodiments, the receiving module 1310 is configured to:
receive second information, where the second information is used to indicate information about the sent synchronization signal blocks.

The second information is beam group information.

The beam group information is represented by using fields whose lengths are N bits and M bits respectively, where the field with the N bits represent sent synchronization signal block groups, and the field with the M bits are synchronization signal blocks in each sent synchronization signal block group.

During specific implementation, the beam group information may be:
N is 16 and M is 16;
N is 16 and M is 8;
N is 8 and M is 16; or
N is 11 and M is 11.

In some embodiments, the synchronization signal block occupies three symbols.

Resource blocks corresponding to the first symbol are used to carry a primary synchronization signal PSS and a physical broadcast channel PBCH, and resource blocks carrying the PBCH are located at two ends of resource blocks carrying the PSS.

Resource blocks corresponding to the second symbol are used to carry the PBCH.

Resource blocks corresponding to the third symbol are used to carry a secondary synchronization signal SSS and the PBCH, and resource blocks carrying the PBCH are located at two ends of resource blocks carrying the SSS.

The terminal device in the embodiment shown in FIG. 13 may be configured to execute the technical solution in the foregoing method embodiments. For an implementation principle and a technical effect of the terminal device, further refer to related descriptions in the method embodiments.

It should be understood that division into the foregoing modules of the terminal device shown in FIG. 13 is merely logical function division. During actual implementation, all or some of the modules may be integrated into one physical entity, or may be physically separated. In some embodiments, all of the modules may be implemented in a form of software invoked by a processing element or in a form of hardware. In some embodiments, some of the modules may be implemented in a form of software invoked by a processing element, and some of the modules may be implemented in a form of hardware. The processing module may be an independently disposed processing element, or may be integrated into the terminal device, for example, a chip of the terminal device for implementation. In some embodiments, the processing module may be stored in a memory of the terminal device in a form of a program to be invoked by a processing element of the terminal device to perform a function of each of the foregoing modules. The receiving module is configured to support the terminal device in performing the operation of receiving information by the terminal device in the embodiments, and may be a receiver, a transceiver, an input interface, or an input circuit. In some embodiments, the terminal device may include a sending module. The sending module may be specifically configured to support the terminal device in performing the operation of sending information by the terminal device in the embodiments. The sending module may be a transmitter, a transceiver, an output interface, or an output circuit. In some embodiments, all or some of the modules may be integrated together, or may be implemented independently. The processing element described herein may be an integrated circuit with a signal processing capability. In an implementation process, operations in the foregoing methods or the foregoing modules can be implemented by using a hardware integrated logical circuit in the processor element, or by using instructions in a form of software.

For example, the foregoing modules may be configured as one or more integrated circuits implementing the foregoing method, for example, one or more application-specific integrated circuits (ASIC), one or more microprocessors (DSP), or one or more field programmable gate arrays (FPGA). For another example, when one of the foregoing modules is implemented in a form of scheduling a program by a processing element, the processing element may be a general purpose processor, for example, a central processing unit (CPU) or another processor that can invoke the program. For still another example, the modules may be integrated together and implemented in a form of a system-on-a-chip (SOC).

An embodiment of this application further provides a communications system. As shown in FIG. 1, the communications system includes a network device 11 and a terminal device 12.

The network device 11 is configured to implement any synchronization signal transmission method performed on a network device side described above. The terminal device 12 is configured to implement any synchronization signal transmission method performed on a terminal device side described above. For brevity, details are not described herein again.

An embodiment of this application further provides a computer-readable storage medium. The computer-readable storage medium stores computer programs. When the computer programs are run on a computer, the computer is enabled to perform the method in the embodiments on the network device side.

An embodiment of this application further provides a computer-readable storage medium. The computer-readable storage medium stores computer programs. When the computer programs are run on a computer, the computer is enabled to perform the method in the embodiments on the terminal device side.

An embodiment of this application further provides a computer program product. The computer program product includes computer programs or instructions, the computer programs or the instructions are stored in a readable storage medium. At least one processor of a network device may read the computer programs or the instructions from the readable storage medium, and the at least one processor executes the computer programs or the instructions, so that the network device implements the synchronization signal transmission method performed by the network device.

An embodiment of this application further provides a computer program product. The computer program product includes computer programs or instructions, the computer programs or the instructions are stored in a readable storage medium. At least one processor of a network device may read the computer programs or the instructions from the readable storage medium, and the at least one processor executes the computer programs or the instructions, so that the terminal device implements the synchronization signal transmission method performed by the terminal device.

In addition, this application further provides a chip, and the chip includes a processor. The processor is configured to read and execute computer programs or instructions stored in a memory, to perform the synchronization signal transmission method in any possible implementation performed by the network device.

In some embodiments, the chip includes the memory, and the memory and the processor are connected by using a circuit or a wire. In some embodiments, the chip includes a communications interface. The processor is connected to the communications interface. The communications interface is configured to receive data and/or information that needs to be processed. The processor obtains (e.g., retrieves, receives, gathers) the data and/or the information from the communications interface, processes the data and/or the information, and outputs a processing result by using the communications interface. The communications interface may be an input/output interface.

This application further provides a chip, including a processor. The processor is configured to read and execute computer programs or instructions stored in a memory, to perform the synchronization signal transmission method in any possible implementation performed by the terminal device.

In some embodiments, the chip includes the memory, and the memory and the processor are connected by using a circuit or a wire. In some embodiments, the chip includes a communications interface. The processor is connected to the communications interface. The communications interface is configured to receive data and/or information that needs to be processed. The processor obtains the data and/or the information from the communications interface, processes the data and/or the information, and outputs a processing result by using the communications interface. The communications interface may be an input/output interface.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to this application are generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid state drive (SSD)).

What is claimed is:

1. A synchronization signal transmission method, comprising:
   determining, by a network device, time domain positions for sending m synchronization signal blocks (SSB), wherein the time domain positions of the synchronization signal blocks are one or more positions in {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit comprises T symbols, m is an integer in [1, T], T is any one of 12, 24, 36, 48, 60, 72, 84, and 96, n represents an index of the time unit, and a value of n is an integer in [0, 157]; and
   sending, by the network device, the synchronization signal blocks to a terminal device in the time domain positions of the synchronization signal blocks.

2. The method of claim 1, wherein each synchronization signal block in the synchronization signal blocks carries first information, and the first information is used to indicate a time domain position index of the synchronization signal block.

3. The method of claim 1, further comprising:
   sending, by the network device, second information, wherein the second information is used to indicate information about the sent synchronization signal blocks.

4. A synchronization signal transmission method, comprising:
   receiving, by a terminal device, m synchronization signal blocks sent by a network device; and
   determining, by the terminal device, a time domain position of a synchronization signal block in the synchronization signal blocks based on information about the synchronization signal block, wherein
   the time domain position of the synchronization signal block is one of {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit comprises T symbols, m is an integer in [1, T], T is any one of 12, 24, 36, 48, 60, 72, 84, and 96, n represents an index of the time unit, and a value of n is an integer in [0, 157].

5. The method of claim 4, wherein each synchronization signal block in the synchronization signal blocks carries first information, and the first information is used to indicate a time domain position index of the synchronization signal block; and
   the determining, by the terminal device, a time domain position of a synchronization signal block in the synchronization signal blocks based on information about the synchronization signal block comprises:
   determining, by the terminal device based on the first information, the time domain position of the synchronization signal block that carries the first information.

6. The method of claim 4, wherein the method further comprises:
   receiving, by the terminal device, second information, wherein the second information is used to indicate information about the sent synchronization signal blocks.

7. The method of claim 4, wherein the first information is one or more demodulation reference signals (DMRS).

8. The method of claim 4, wherein
   if T is 12, m is an integer in [1, 8], and a value of any start symbol index in s1, s2, . . . , and sm is any value in [1, 9];
   if T is 24, m is an integer in [1, 8], and a value of any start symbol index in s1, s2, . . . , and sm is any value in [1, 22];
   if T is 48, m is an integer in [1, 16], and a value of any start symbol index in s1, s2, . . . , and sm is any value in [1, 44]; or
   if T is 96, m is an integer in [1, 32], and a value of any start symbol index in s1, s2, . . . , and sm is any value in [1, 90].

9. The method of claim 4, wherein the time domain positions are {s1, s2, s3}+n×12; and
   s1 is 2, s2 is 5, and s3 is 8; or s1 is 3, s2 is 6, and s3 is 9.

10. The method of claim 9, wherein a value of n is:
    any integer in 0 to 43;
    any integer in 0 to 54 except values with single digits being 4 and 9; or
    any integer in 0 to 54 except values with single digits being 8 and 9.

11. The method of claim 4, wherein the time domain positions are {s1, s2}+n×12; and
    a value of s1 is one of 2, 3, 4, 5, and 6, a value of s2 is one of 5, 6, 7, and 8, and a difference between the value of s2 and the value of s1 is greater than or equal to a quantity of symbols occupied by the synchronization signal block.

12. The method of claim 11, wherein a value of n is:
    any integer in 0 to 78 except values with single digits being 8 and 9;
    any integer in 0 to 78 except values with single digits being 5 and 9;
    any integer in 0 to 157;
    any integer in 0 to 157 except values with single digits being 8 and 9;
    any integer in 0 to 157 except values with single digits being 4 and 9; or any integer in 0 to 157 except values with single digits being 6, 7, 8, and 9.

13. The method of claim 4, wherein the time domain positions are {s1, s2, s3, s4}+n×24; and
s1 is 2, s2 is 6, s3 is 14, and s4 is 18; s1 is 1, s2 is 5, s3 is 13, and s4 is 17; or s1 is 3, s2 is 7, s3 is 15, and s4 is 19.

14. The method of claim 13, wherein a value of n is:
any integer in 0 to 39;
any integer in 0 to 39 except values with single digits being 4 and 9;
any integer in 0 to 79; or
any integer in 0 to 79 except values with single digits being 4 and 9.

15. The method of claim 4, wherein the synchronization signal block occupies three symbols, wherein
resource blocks corresponding to the first symbol are used to carry a primary synchronization signal (PSS) and a physical broadcast channel (PBCH), and resource blocks carrying the PBCH are located at two ends of resource blocks carrying the PSS;
resource blocks corresponding to the second symbol are used to carry the PBCH; and
resource blocks corresponding to the third symbol are used to carry a secondary synchronization signal (SSS) and the PBCH, and resource blocks carrying the PBCH are located at two ends of resource blocks carrying the SSS.

16. A terminal device, comprising:
a receiver, configured to receive m synchronization signal blocks sent by a network device; and
a processor, configured to determine a time domain position of a synchronization signal block in the synchronization signal blocks based on information about the synchronization signal block, wherein
the time domain position of the synchronization signal block is one of {s1, s2, . . . , sm}+n×T, s1 represents a start symbol index of the first synchronization signal block in a time unit, s2 represents a start symbol index of the second synchronization signal block in the time unit, sm represents a start symbol index of an $m^{th}$ synchronization signal block in the time unit, the time unit comprises T symbols, m is an integer in [1, T], T is any one of 12, 24, 36, 48, 60, 72, 84, and 96, n represents an index of the time unit, and a value of n is an integer in [0, 157].

17. The terminal device of claim 16, wherein each synchronization signal block in the synchronization signal blocks carries first information, and the first information is used to indicate a time domain position index of the synchronization signal block; and
the processor is specifically configured to:
determine, based on the first information, the time domain position of the synchronization signal block that carries the first information.

18. The terminal device of claim 16, wherein the receiver is further configured to:
receive second information, wherein the second information is used to indicate information about the sent synchronization signal blocks.

19. The terminal device of claim 16, wherein the first information is one or more demodulation reference signals (DMRS).

20. The terminal device of claim 16, wherein the synchronization signal block occupies three symbols, wherein
resource blocks corresponding to the first symbol are used to carry a primary synchronization signal (PSS) and a physical broadcast channel (PBCH), and resource blocks carrying the PBCH are located at two ends of resource blocks carrying the PSS;
resource blocks corresponding to the second symbol are used to carry the PBCH; and
resource blocks corresponding to the third symbol are used to carry a secondary synchronization signal (SSS) and the PBCH, and resource blocks carrying the PBCH are located at two ends of resource blocks carrying the SSS.

* * * * *